US010374689B2

(12) United States Patent
Breiling et al.

(10) Patent No.: US 10,374,689 B2
(45) Date of Patent: Aug. 6, 2019

(54) CONTROLLER FOR A SUDA SYSTEM

(71) Applicant: Fraunhofer-Gesellschaft zur Foerderung der angewandten Forschung e.V., Munich (DE)

(72) Inventors: Marco Breiling, Erlangen (DE); Thomas Heyn, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/439,759

(22) Filed: Feb. 22, 2017

(65) Prior Publication Data
US 2017/0163333 A1 Jun. 8, 2017

Related U.S. Application Data

(63) Continuation of application No. PCT/EP2015/069290, filed on Aug. 21, 2015.

(30) Foreign Application Priority Data

Aug. 27, 2014 (EP) ..................................... 14182546

(51) Int. Cl.
H04W 4/06 (2009.01)
H04B 7/155 (2006.01)
H04W 76/14 (2018.01)

(52) U.S. Cl.
CPC .......... *H04B 7/15592* (2013.01); *H04W 4/06* (2013.01); *H04W 76/14* (2018.02)

(58) Field of Classification Search
CPC .. H04B 7/15592; H04W 76/023; H04W 4/06; H04W 84/12; H04L 12/6418; H04L 12/66
See application file for complete search history.

(56) References Cited

U.S. PATENT DOCUMENTS

| 2005/0107033 | A1 | 5/2005 | Kates et al. |
| 2007/0160014 | A1 | 7/2007 | Larsson |
| 2008/0165720 | A1 | 7/2008 | Hu et al. |
| 2010/0008294 | A1 | 1/2010 | Palanki et al. |
| 2012/0149411 | A1* | 6/2012 | Miyoshi ............... H04B 7/0413 455/501 |
| 2017/0163333 | A1 | 6/2017 | Breiling et al. |

FOREIGN PATENT DOCUMENTS

| EP | 2001000 A2 | 12/2008 |
| GB | 2424800 A | 10/2006 |

(Continued)

OTHER PUBLICATIONS

Breiling, Marco et al., "Resource Allocation for Outdoor-to-Indoor Multi Carrier Transmission with Shared UE-side Distributed Antenna Systems", Vehicular Technology Conference (VTC Spring), 2015 IEEE 81st, May 14, 2015, May 14, 2015, 1-7.

(Continued)

Primary Examiner — Jamal Javaid
(74) Attorney, Agent, or Firm — Perkins Coie LLP; Michael A. Glenn

(57) ABSTRACT

An aspect refers a controller of a SUDA system, the SUDA system having a first base station network group and a second base station network group, at least a first SUDAC (SUDA Component, which may be simplified described as configurable relay forwarding data) as well as a first user equipment assigned to the first base station network group and a second user equipment assigned to the second base station network group (e.g. both belonging to the same telecommunication provider).

23 Claims, 17 Drawing Sheets

(56) References Cited

FOREIGN PATENT DOCUMENTS

| JP | 2008530946 A | 8/2008 |
|---|---|---|
| JP | 5270648 B2 | 8/2013 |
| KR | 10-2006-0113973 | 11/2006 |
| RU | 2471290 C2 | 12/2012 |
| RU | 2649902 C1 | 4/2018 |
| WO | 2005064872 A1 | 7/2005 |
| WO | 2006088400 A1 | 8/2006 |
| WO | 2007068999 A1 | 6/2007 |
| WO | 2014004996 A1 | 1/2014 |

OTHER PUBLICATIONS

Nakanishi, Yuki et al., "Throughput of Multi-User MIMO Distributed Antenna System Applying Distributed Transmission to a Plurality of Channels", IEICE (Institute of Electronics, Information and Communication Engineers) Technical report, Aug. 12, 2014, vol. 114, No. 180, RC52014-140, Aug. 12, 2014, 7-12.

Buratti, C. et al., "Capacity Analysis of Two-Hop Virtual MIMO Systems in a Poisson Field of Nodes", IEEE 69th Vehicular Technology Conference; Apr. 26, 2009, pp. 1-6.

Grant, AJ et al., "Rate-splitting multiple access for discrete memoryless channels", IEEE Transactions on Information Theory; vol. 47; No. 3; Mar. 2001, pp. 873-890.

Jiang, J. et al., "Performance assessment of virtual multiple-input systems with compress-and-forward cooperation", IET Commnunications; vol. 6; No. 11; Jul. 24, 2012, pp. 1456-1465.

Ranvier, S. et al., "Low-Cost Planar Omnidirectional Antenna for mm-Wave Applications", IEEE Antennas and Wireless Propagation Letters; vol. 7; Jan. 1, 2008, pp. 521-523.

* cited by examiner

CONTROLLER FOR A SUDA SYSTEM

CROSS-REFERENCE TO RELATED APPLICATIONS

This application is a continuation of copending International Application No. PCT/EP2015/069290, filed Aug. 21, 2015, which is incorporated herein by reference in its entirety, and additionally claims priority from European Application No. 14182546.3, filed Aug. 27, 2014, which is also incorporated herein by reference in its entirety.

BACKGROUND OF THE INVENTION

Embodiments of the present invention relate to a controller for a SUDA system (also referred to as Shared User Equipment-Side Distributed Antenna System), to a method for controlling a SUDA system and to a computer program.

Already during their deployment, current 4G mobile communications systems (like LTE-Advanced) appear to suffer from a shortage of data rate that can be provided to the users. It is expected that in the future, the data rate requested by the users grows considerably, which is mainly due to reception of video contents. There is a trend to an increased consumption of non-linear TV/video, i.e. video contents that is not being broadcast at the very moment of its consumption. Besides broadcast contents that is consumed at some later point after its transmission (like the offering of the TV channels' media centers) and that could be stored inside a cache in the user equipment (UE) until its consumption, there is a vast realm of content that cannot simply be distributed by conventional broadcast systems (satellite, terrestrial, cable TV) like YouTube videos. At the same time the contents consumed in the homes necessitates increasingly high data rate, for instance for Ultra-High Definition TV (UHDTV) or 3D contents (with or without dedicated 3D-glasses).

Moreover, people exchange, i.e. down and upload increasingly large files. While this is currently photos of a couple of megabytes, people are going to download complete movies of many gigabytes from their mobile devices in the future. For such actions people are keen to keep the download times as short as possible, such that very high data rates in the order of ten gigabit/s are a realistic requirement for the future. As people are going to use cloud services to a greater extent in the future, there will be a need for fast synchronization of the contents on a mobile device with the cloud when people leave or enter the coverage of a mobile network, i.e. before they go off-line and after they return from on off-line state. The amount of data to synchronize could be quite large. All of this shows that transmission at very high data rates is a must in the future for many (mobile and stationary) devices.

An alternative to using mobile communications like LTE for downloading such large files is the employment of a local area network (LAN), be it wireless (WLAN, W-Fi) or wired (Ethernet). However, the last mile from the backbone network to the homes cannot support the necessitated high data rates in the range of Gbit/s, except if optical fibers are used (fiber-to-the-home FTTH). However, the cost to equip the homes with FTTH is very high; for instance for Germany alone, the cost to equip every building with FTTH is estimated around 93 billion/milliard Euros. Therefore, the last mile will eventually become a mainly wireless connection. This reduces the cost for bringing broadband to every building and its rooms significantly.

Moreover, most homes do not possess a dedicated wired LAN infrastructure (Ethernet) to distribute the data received over the last mile further, i.e. most homes employ Wi-Fi to connect their devices to the Internet by their access point (AP), where the AP represents the terminal point of the last mile. It should be observed that for reaching data rates of Gbit/s, either an Ethernet socket or an AP is necessitated in each room of every home or office building. Hence the cost of connecting each room of each building is added to the figure mentioned above for connecting the buildings.

FIG. 9a shows a typical situation of a state of the art approach for exchanging data signals between a base station 10 and one or more user equipments 20a and 20b, which are positioned in a known surrounding, like the home. As illustrated, the user equipment 20a and 20b may be a smartphone, tablet PC or notebook. The exchange between the user equipment 20a/20b and the base station 10 is performed by means of a small cell base station 30.

Here, the small cell base station 30, also referred to as an access point, is connected to the base station 10 enabling the connection to the internet background by a plurality of antennas. In detail, base station 10 has three antennas 12a, 12b and 12c, wherein the access point 13 has two antennas 32a and 32b. In such a configuration, the base station 10 and the access point 30 form a 3×2 MIMO system (MIMO: Multiple Input Multiple Output). This has the purpose that 2-fold spatial multiplexing can be used as it is implemented or planned for communication standards like UMTS or LTE. The access point 30 forwards the data to the user equipment 20a and 20b, e.g. by using short range radio communication standards like Wi-Fi. In the shown example, the user equipment 20a and 20b possesses two antennas (not marked by reference numerals), so two 2×2 MIMO systems together with the access point 30 are formed such that again 2-fold spatial multiplexing may be used. Note that such a Wi-Fi system typically uses a different frequency band than the mobile communication system (between 30 and 10).

FIG. 10b shows a simple alternative, wherein no access point is present in the home. Here, the user equipment 20a and 20b are connected directly to the base station 10. Two 3×2 MIMO systems are present due to the fact that the user equipment 20a and 20b possesses at least two antennas, wherein the base station 30 possesses three antennas 12a, 12b and 12c. This enables that 2-fold spatial multiplexing may be used.

Unfortunately, current 4G and Wi-Fi systems cannot reach the high data rates motivated above: The capacity that can be transmitted for every transmit antenna of a base station (or AP in the case of Wi-Fi, respectively) is limited by the used signal constellation, and similarly, the capacity received for every receive antenna is limited by the used signal constellation as well. For instance, using 64-QAM constellations cannot reach higher spectral efficiencies than 6 bit/s/Hz per transmit or receive antenna. Hence, there are two ways to increase the overall data rate of a communications link:

Firstly: Increase the available frequency bandwidth: current systems mostly work in the sub-6 GHz bands (with the exception of some Wi-Fi frequency bands above 6 GHz); frequencies in this range are sought after for various applications and services and are hence scarce. Possibly, further digital dividends can be obtained from the spectrum part that is currently still occupied by TV broadcasting.

Secondly: Increase the number of transmit and receive antennas: possibly, the number of antennas at the base station side can be increased significantly, for instance using distributed antenna systems (DAS). However, for the User Equipment (UE) side, the physical dimensions of the terminal limit the number of antennas that can be integrated. To achieve sufficient decorrelation of the channel coefficients between each transmit and each receive antenna, the spacing between the transmit antennas and also between the receive antennas has to be at least $0.5 \cdot \lambda$ [gesbert03], where $\lambda$ is the employed wave length. For 1 GHz carrier frequency, $\lambda$ is 30 cm and for 6 GHz, it is 5 cm. Therefore, current handheld user equipments carry typically only 2 antennas, and even for tablet or notebook-size user equipments, 4 antennas does almost never provide four times the throughput of one antenna because of the resulting correlation between the antennas. More than 4 antennas are not considered useful for any handheld user equipment device.

As an example, assume that the goal is to transmit to a user equipment at a data rate of 10 Gbit/s (observe that this is a realistic objective assumed in current discussion about the future 5G standard). Let us assume that a future base station can allocate up to 300 MHz (using methods like carrier aggregation) in the sub-6 GHz bands, and that a single user equipment is allocated 50% of the total time-frequency-resources in the downlink. The base station might possess quite many antennas, while the phone-size user equipment is limited to 2 antennas. Hence, only two individual streams can be spatially multiplexed. Each of them has to reach a spectral efficiency of $$\frac{10 \; Gbit/s}{300 \; MHz \cdot 50\% \cdot 2} = 33.3 \; Bit/symbol.$$

Taking into account that a FEC code is needed that adds some redundancy, in this example, each spatial stream would have to employ a signal constellation of at least $2^{34}$ signal points. It is obvious that such a high constellation cardinality cannot be supported realistically.

Therefore, other solutions are needed for this problem. In the recent years, researchers have started to investigate, what the next-generation mobile communications system 5G could be like. One of the most appealing ideas is to extend the used spectrum to mm-wave, i.e. to the frequency range 30-300 GHz. There are still frequency bands of several hundred MHz or even several GHz, which could be made available to mobile communications. This would be very helpful for providing sufficient bandwidth such that the spectral efficiency does not need to be as high as shown in the example above. However, the range of coverage for the signals at such high frequencies is much smaller than in the sub 6 GHz bands. For instance, the oxygen molecule has its resonance frequency between 57 and 64 GHz. Within this frequency range, oxygen absorbs much of the transmitted power. Building walls are also severe obstacles of mm-wave signals that cause massive attenuation. mm-wave communication quite resembles optical propagation, which hardly allows any communication when the communication link is non-line-of-sight (NLOS).

These arguments are the reason why for 5G mostly the concept of a two-tier network is considered. This concept is in fact similar to what is shown in FIG. 10a, when the AP is replaced by a Small Cell Base Station (SCBS) and the Wi-Fi connections (solid lines) are replaced by mm-wave links. As APs for W-Fi-like systems are very similar to SOBS, both will be represented by the term SOBS in the sequel, while the term base station (BS) represents a macro-cell base station in this document. The name "two-tier network" comes from the fact that in a first tier, the data is exchanged between base station and SOBS, while in a second tier, the data exchange occurs between SOBS and user equipments.

The (wired or microwave link) backhauling for such a system has to connect only the base stations but not the SOBS to the backbone, which ensures a relatively modest cost of the entire system.

Often both ends of the communication link (source and destination) are located within the same small cell (e.g. downloading a video from a server inside the home to the user equipment in the same building), but in other cases, the user necessitates a high data rate to be provided from or to the base station (e.g. downloading the video from the cloud to the user equipment). In this case, similar data rate limits apply for the link between base station and SOBS as shown in the example above. Let us assume that the SOBS possesses 6 antennas for the sub 6 GHz communication to the base station, which is already a large number of antennas for a relatively small device as a SOBS, but which would allow up to 6-fold spatial multiplexing. Coming back to the above example, in order to achieve 10 Gbit/s, each spatial stream has still to achieve a spectral efficiency of approximately 11.1 bit/symbol. That means that at least a 1024-QAM or 4096-QAM has to be used in each spatial stream. Such a large constellation needs a very high SNR to work and is difficult to demodulate correctly (due to imperfect channel estimation, phase noise, transmitter and receiver non-linearities, signal quantization etc.). Moreover, such an SOBS has to be placed in almost every room and has to be quite large in order to separate its 6 antennas sufficiently in space and thereby decorrelate their respective propagation paths. From both points, the communication in the macro-cell between the macro-cell base station and the SOBS represents a kind of bottleneck for the overall communication system.

Therefore, there is the need for an improved approach. An objective of the present invention is to provide an universally applicable communication system enabling based on the current base station resources high data rates while avoiding the above discussed drawbacks and a method for effectively organizing the communication system.

SUMMARY

An embodiment may have a controller of a SUDA system, the SUDA system having a first base station network group and a second base station network group, at least a first SUDAC as well as a first user equipment assigned to the first base station network group and a second user equipment assigned to the first base station network group; wherein each SUDAC is configured to use ultra-high frequency in order to transmit at least one backend communication signal to the first and/or the second base station network group and to use extremely-high frequency in order to transmit at least one frontend communication signal to the first and/or the second user equipment and to forward a payload signal received via the backend communication signal and to be transmitted via the frontend communication signal while frequency converting the ultra-high frequency to the extremely-high frequency and to forward the payload signal received via the frontend communication signal and to be transmitted via the backend communication signal while frequency converting the extremely-high frequency to the ultra-high frequency; wherein the first user equipment is configured to communicate via a first frontend communication signal with the first SUDAC and via a second frontend communication signal with a second SUDAC or via a direct communication signal directly with the first base station network group, wherein the first frontend communication signal is converted to a first backend communication signal used for communication with the first base station network group by the first SUDAC and wherein the second frontend communication signal is converted to a second backend communication signal used for communication with the first base station network group by the second SUDAC; wherein the second user equipment is configured to communicate via a first frontend communication signal with the first SUDAC and via an second frontend communication signal with the second SUDAC or via a direct communication signal directly with the second base station network group, wherein the first frontend communication signal is converted to a first backend communication signal used for communication with the second base station network group by the second SUDAC and wherein the second frontend communication signal ($21b\_2$) is converted to a second backend communication signal used for communication with the second base station network group by the first SUDAC; wherein the first and the second user equipment are configured to aggregate the first and the second frontend communication signals or the first frontend communication signal and the direct communication signal in order to increase an available data rate; wherein the controller is configured to select first resources, wherein a first portion of the first resources characterizes settings of the first frontend communication signal and of the corresponding first backend communication signal and wherein a second portion of the first resources characterizes settings of the second frontend communication signal and of the corresponding second backend communication signal, for the first user equipment and to select second resources, wherein a first portion of the second resources characterizes settings of the first frontend communication signal and of the corresponding first backend communication signal and wherein a second portion of the second resources characterizes settings of the second frontend communication signal and of the corresponding second backend communication signal, for the second user equipment, taking into account data rate requirements and/or data rate capabilities of the first and/or second user equipment and/or of the first and/or second base station network group and/or such that the first frontend communication signals of the first and the second user equipment as well as the second frontend communication signals of the first and the second user equipment are distinguishable from each other and/or such that transmission losses caused by interferences within the first frontend communication signal and the second frontend communication signal of the first and second user equipment are reduced.

Another embodiment may have a first user equipment having the above controller.

Another embodiment may have a SUDAC which is controllable by the above controller.

According to another embodiment, a SUDA system may have a first base station network group and a second base station network group, a first and a second SUDAC as well as a first user equipment assigned to the first base station network group and a second user equipment assigned to the first base station network group and the above controller.

Another embodiment may have a method for controlling a SUDA system, the SUDA system having a first base station network group and a second base station network group, at least a first SUDAC as well as a first user equipment assigned to the first base station network group and a second user equipment assigned to the first base station network group, wherein each SUDAC is configured to use ultra-high frequency in order to transmit at least one backend communication signal to the first and/or the second base station network group and to use extremely-high frequency in order to transmit at least one frontend communication signal to the first and/or the second user equipment and to forward a payload signal received via the backend communication signal and to be transmitted via the frontend communication signal while frequency converting the ultra-high frequency to the extremely-high frequency and to forward the payload signal received via the frontend communication signal and to be transmitted via the backend communication signal while frequency converting the extremely-high frequency to the ultra-high frequency, wherein the first user equipment is configured to communicate via a first frontend communication signal with the first SUDAC and via a second frontend communication signal with a second SUDAC or via a direct communication signal directly with the first base station network group, wherein the first frontend communication signal is converted to a first backend communication signal used for communication with the first base station network group by the first SUDAC and wherein the second frontend communication signal is converted to a second backend communication signal used for communication with the first base station network group by the second SUDAC; wherein the second user equipment is configured to communicate via a first frontend communication signal with the first SUDAC and via a second frontend communication signal with the second SUDAC or via a direct communication signal directly with the second base station network group, wherein the first frontend communication signal is converted to a first backend communication signal used for communication with the second base station network group by the second SUDAC and wherein the second frontend communication signal is converted to a second backend communication signal used for communication with the second base station network group by the first SUDAC; wherein the first and the second user equipment are configured to aggregate the first and the second frontend communication signal or the first frontend communication signal and the direct communication signal in order to increase an available data rate; wherein the method may have the steps of: selecting first resources, wherein a first portion of the first resources characterizes settings of the first frontend communication signal and of the corresponding first backend communication signal and wherein a second portion of the first resources characterizes settings of the second frontend communication signal and of the corresponding second backend communication signal, for the first user equipment; and selecting second resources, wherein a first portion of the second resources characterizes settings of the first frontend communication signal and of the corresponding first backend communication signal and wherein a second portion of the second resources characterizes settings of the second frontend communication signal and of the corresponding second backend communication signal, for the second user equipment, taking into account requirements of the first and/or second user equipment and/or of the first and/or second base station network group and/or such that the first frontend communication signals of the first and the second user equipment as well as the second frontend communication signals of the first and the second user equipment are distinguishable from each other and/or such that transmission losses caused by interferences within the first frontend communication signal and the second frontend communication signal of the first and second user equipment are reduced.

Still another embodiment may have a non-transitory digital storage medium having stored thereon a computer program for performing a method for controlling a SUDA system, the SUDA system having a first base station network group and a second base station network group, at least a first SUDAC as well as a first user equipment assigned to the first base station network group and a second user equipment assigned to the first base station network group, wherein each SUDAC is configured to use ultra-high frequency in order to transmit at least one backend communication signal to the first and/or the second base station network group and to use extremely-high frequency in order to transmit at least one frontend communication signal to the first and/or the second user equipment and to forward a payload signal received via the backend communication signal and to be transmitted via the frontend communication signal while frequency converting the ultra-high frequency to the extremely-high frequency and to forward the payload signal received via the frontend communication signal and to be transmitted via the backend communication signal while frequency converting the extremely-high frequency to the ultra-high frequency, wherein the first user equipment is configured to communicate via a first frontend communication signal with the first SUDAC and via a second frontend communication signal with a second SUDAC or via a direct communication signal directly with the first base station network group, wherein the first frontend communication signal is converted to a first backend communication signal used for communication with the first base station network group by the first SUDAC and wherein the second frontend communication signal is converted to a second backend communication signal used for communication with the first base station network group by the second SUDAC; wherein the second user equipment is configured to communicate via a first frontend communication signal with the first SUDAC and via a second frontend communication signal with the second SUDAC or via a direct communication signal directly with the second base station network group, wherein the first frontend communication signal is converted to a first backend communication signal used for communication with the second base station network group by the second SUDAC and wherein the second frontend communication signal is converted to a second backend communication signal used for communication with the second base station network group by the first SUDAC; wherein the first and the second user equipment are configured to aggregate the first and the second frontend communication signal or the first frontend communication signal and the direct communication signal in order to increase an available data rate; the method having the steps: selecting first resources, wherein a first portion of the first resources characterizes settings of the first frontend communication signal and of the corresponding first backend communication signal and wherein a second portion of the first resources characterizes settings of the second frontend communication signal and of the corresponding second backend communication signal, for the first user equipment; and selecting second resources, wherein a first portion of the second resources characterizes settings of the first frontend communication signal and of the corresponding first backend communication signal and wherein a second portion of the second resources characterizes settings of the second frontend communication signal and of the corresponding second backend communication signal, for the second user equipment, taking into account requirements of the first and/or second user equipment and/or of the first and/or second base station network group and/or such that the first frontend communication signals of the first and the second user equipment as well as the second frontend communication signals of the first and the second user equipment are distinguishable from each other and/or such that transmission losses caused by interferences within the first frontend communication signal and the second frontend communication signal of the first and second user equipment are reduced, when said computer program is run by a computer.

Another embodiment may have a controller of a SUDA system, the SUDA system having a first base station network group, at least a first SUDAC and at least a first BS-SUDAC as well as a first user equipment, wherein each SUDAC is configured to use ultra-high frequency in order to transmit at least one backend communication signal to the first base station network group or at least one inter-backend communication signal to the BS-SUDAC and to use extremely-high frequency in order to transmit at least one frontend communication signal to the first user equipment and to forward a payload signal received via the backend communication signal or received via the inter-backend communication signal and to be transmitted via the frontend communication signal while frequency converting the ultra-high frequency to the extremely-high frequency and to forward the payload signal received via the frontend communication signal and to be transmitted via the backend communication signal or to be transmitted via the inter-backend communication signal while frequency converting the extremely-high frequency to the ultra-high frequency; wherein each BS-SUDAC is configured to use extremely-high frequency in order to transmit at least one frontend communication signal to the first base station network group and to use ultra-high frequency in order to transmit at least one inter-backend communication signal to the first SUDAC or in order to transmit at least one backend communication signal to the first user equipment and to forward a payload signal received via the frontend communication signal and to be transmitted via the inter-backend communication signal or via the backend communication signal while frequency converting the extremely-high frequency to the ultra-high frequency and to forward the payload signal received via the inter-backend communication signal or received via the backend communication signal and to be transmitted via the frontend communication signal while frequency converting the ultra-high frequency to the extremely-high frequency; wherein the first user equipment is configured to communicate via a first direct communication signal with the first base station group directly or via a first frontend communication signal with the first SUDAC, wherein the first frontend communication signal is converted to a first backend communication signal used for communication with the first base station network group by the first SUDAC; and/or wherein the first frontend communication signal is converted to a first inter-backend communication signal used for communication with the first base station network group via the BS-SUDAC by the first SUDAC; wherein the controller is configured to select first resources, wherein a first portion of the first resources characterizes settings of the first frontend communication signal and of the corresponding first backend communication signal or of the inter-backend communication signal, taking into account data rate requirements and/or data rate capabilities of the first and user equipment and/or of the first base station network group, and/or such that the first frontend communication signals of the first user equipment are distinguishable from other signals and/or such that transmission losses caused by interferences within the first frontend communication signal of the first user equipment are reduced.

An embodiment provides a controller of a SUDA system, the SUDA system comprising a first base station network group and a second base station network group, at least a first SUDAC (SUDA Component, which may be simplified described as configurable relay forwarding data) as well as a first user equipment assigned to the first base station network group and a second user equipment assigned to the second base station network group (e.g. both belonging to the same telecommunication provider). Each SUDAC is configured to use ultra-high frequency (e.g. sub-6 Ghz) in order to transmit at least one backend communication signal (between a SUDAC and a BS e.g. via 5G or LTE) to the first and/or the second base station network group and to use extremely-high frequency (e.g. 60 Ghz) in order to transmit at least one frontend communication signal (between a UE and a SUDAC using a so-called short-range communication) to the first and/or the second user equipment and to forward a payload signal received via the backend communication signal and to be transmitted via the frontend communication signal while frequency converting the ultra-high frequency to the extremely-high frequency and to forward the payload signal received via the frontend communication signal and to be transmitted via the backend communication signal while frequency converting the extremely-high frequency to the ultra-high frequency. The first user equipment is configured to communicate via a first frontend communication signal with the first SUDAC and via a second frontend communication signal with a second SUDAC or via a direct communication signal directly with the first base station network group, wherein the first frontend communication signal is converted to a first backend communication signal used for communication with the first base station network group by the first SUDAC and wherein the second frontend communication signal is converted to a second backend communication signal used for communication with the first base station network group by the second SUDAC. The second user equipment is configured to communicate via a first frontend communication signal with the first SUDAC and via a second frontend communication signal with the second SUDAC or a direct communication signal directly with the second base station network group, wherein the first frontend communication signal is converted to a first backend communication signal used for communication with the second base station network group by the second SUDAC and wherein the second frontend communication signal is converted to a second backend communication signal used for communication with the second base station network group by the first SUDAC. The first and the second user equipment are configured to aggregate the first and the second frontend communication signals or the first frontend communication signals and the direct communication signals in order to increase an available data rate, wherein the controller is configured to select first resources, wherein a first portion of the first resources characterizes settings of the first frontend communication signal and of the corresponding first backend communication signal and wherein a second portion of the first resources characterizes settings of the second frontend communication signal and of the corresponding second backend communication signal, for the first user equipment and to select second resources, wherein a first portion of the second resources characterizes settings of the first frontend communication signal and of the corresponding first backend communication signal and wherein a second portion of the second resources characterizes settings of the second frontend communication signal and of the corresponding second backend communication signal, for the second user equipment, such that the first frontend communication signals of the first and the second user equipment as well as the second frontend communication signals of the first and the second user equipment are distinguishable from each other and/or such that available data rates are assigned to each user equipment according to its requirements and/or the capabilities of the user equipments, the SUDACs and/or the base station network groups, to support given carrier frequencies, carrier spacings, bandwidths, powers etc. and/or a policy regulation defined by the network operators concerning the prioritization of providing given data rates to given users, and/or such that transmission losses caused by interferences within the first frontend communication signal and the second frontend communication signal of the first and second user equipment are reduced. Advantageously, the controller enables, that the one SUDA system comprising a plurality of SUDACs serves as relay network for plurality of user equipments belonging to different telecommunication provides.

Teachings disclosed herein are related to a SUDA system, comprising a plurality of SUDACs (configurable relay stations) enabling to improve the connection between an user equipment, like a mobile phone or smartphone, and the base station group, e.g. base stations of telecommunication provider, by establishing two communication channels in parallel, here referred to as by first communication and second communication, so as to enhance the available data rate. In detail, from one user equipment a plurality of communication signals (cf. first communication signal and second communication signal) are exchanged via the frontend communication to a plurality of SUDACs which forward the communication signals as backend communication signals to the respective base station group. The improvements regarding the date rate are achieved due to the fact that the frontend uses a short distance communication technology (e.g. 60 GHz-communication) while the backend communication is based on conventional MIMO communication systems (like LTE), but performed by the SUDACS which are spaced apart from each other such that an increased number of parallel communication channels may be established more easily. The SUDA system has to be effectively controlled in order to allow good usage of SUDA system to the plurality of user equipments. Therefore teachings disclosed herein provide a controller for controlling the SUDA system in a manner that the plurality of SUDACs may be used by different user equipments assigned to different base station groups, e.g. of different telecommunication providers. The controlling is performed such that the respective channels (first communication channel and second communication channel) of the different user equipments transmitted via the SUDACs of the one SUDA system are separated from each other.

According to an embodiment, the separation may be done by assigning different resources, e.g. resources in time or resources in frequency or resources regarding the used (spreading) code, to the different communication channels. In detail, the controller is, according to an embodiment, configured to control via a control signal the time-resources of the first and the second user equipment and of the first and the second SUDAC comprising a memory by assigning respective time slots to the first and the second frontend communication signals and/or to the first and the second backend communication signal, in order to perform TDM/TDMA modulation. According to a further embodiment the controller is configured to control via the control signal the frequency-resources of the first and the second user equipment and of the first and the second SUDAC comprising a frequency and multiplexing converter by assigning respective carrier frequencies to the first and the second frontend communication signals and/or to the first and the second backend communication signal, in order to perform FDM/FDMA modulation. According to another embodiment and the controller is configured to control via the control signal the code-resources of the first and the second user equipment and of the first and the second SUDAC comprising a processor by assigning respective special coding schemes to the first and the second frontend communication signals and/or to the first and the second backend communication signal, in order to perform CDM/CDMA modulation. Furthermore, the controller is according to an embodiment configured to control via the control signal the space-resources of the first and the second user equipment using the first and the second SUDAC as virtual antennas by transmitting the respective first communication signals and/or the second frontend communication signals to the respective SUDACs, in order to perform SDM/SDMA modulation. Furthermore the controller may be configured to control via the control signal the further resources comprising variable factors out of a group comprising carrier frequency, carrier spacing, signal power, polarization type, indices of the antenna element, beamforming parameters and/or DSSS-spreading parameters.

According to a further embodiment the controller controls the first and second SUDAC, which are configurable and comprise a frequency and multiplexing converter being configured to forward the payload signal from the first user equipment to first base station group or from the first base station group to first user equipment dependent on the settings for the first user equipment, selected by the controller, while changing the multiplexing type in respect to time, frequency and/or code; and wherein the first and second SUDAC comprising the frequency and multiplexing converter being configured to forward payload signal from the second user equipment to second base station group or from the second base station group to second user equipment dependent on the settings for the second user equipment, selected by the controller, while changing the multiplexing type in respect to time, frequency and/or code.

According to an additional embodiment, the controller may be implemented into an user equipment or may be implemented as a shared controller, i.e. that the controller is implemented as a control algorithm executed by a plurality of entities, like a plurality of user equipments.

According to a further embodiment, a method for controlling a SUDA system comprises the steps of selecting the first and second resources, such that the first frontend communication signals of the first and the second user equipment as well as the second frontend communication signals of the first and the second user equipment are distinguishable from each other and/or such that transmission losses caused by interferences within the first frontend communication signal and the second frontend communication signal of the first and second user equipment are reduced.

According to a further embodiment the controller controls a system comprising a first base station network group, at least a first SUDAC and at least a first BS-SUDAC as well as a first user equipment, wherein the BS-SUDAC represents a SUDAC for the base station, which may be here a home base station, According to a further embodiment, a computer program for this method is provided.

BRIEF DESCRIPTION OF THE DRAWINGS

Embodiments of the present invention will subsequently will be discussed referring to the enclosed drawings, wherein:

FIG. 1d shows an enhanced implementation of the system described by FIG. 1a;

FIG. 8b shows a schematic diagram illustrating the cross-influence of two UEs on the resulting data rate for the embodiment of 8a;

DETAILED DESCRIPTION OF THE INVENTION

Below, embodiments of the present invention will be discussed in detail, wherein identical reference numbers are provided to objects having identical or similar functions, so that the description thereof is interchangeable or mutually applicable.

First, a SUDA system and the functionality of same will be discussed before describing the control mechanism used for controlling the SUDA system and, especially, the controller.

Figure 1A:
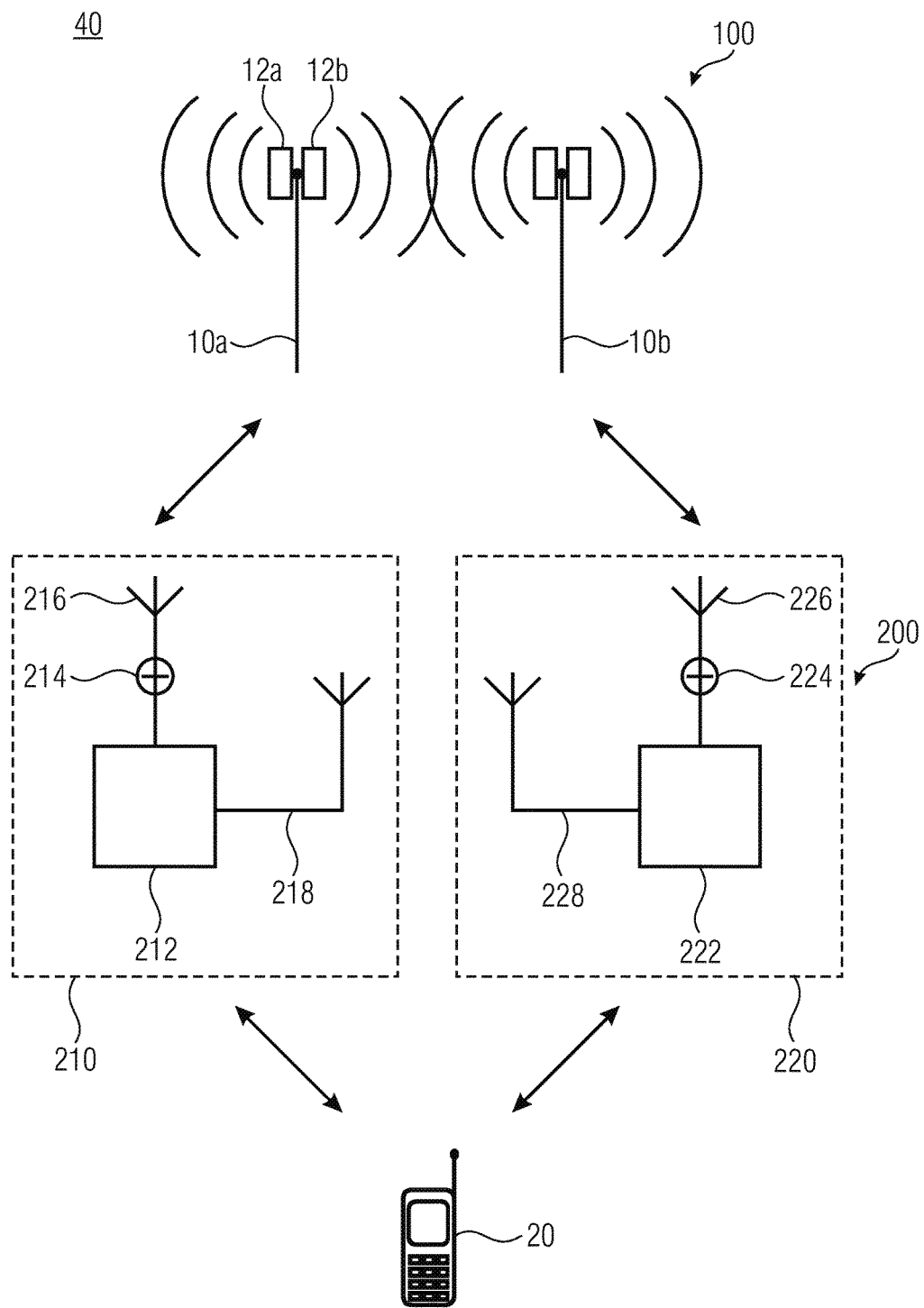
FIG. 1a shows a schematic block diagram of a system comprising a base station system, a SUDA system and at least a user equipment.

FIG. 1a shows a system 40 comprising a base station system 100, a SUDA system 200 and a user equipment 20.

The base station system 100, e.g. a base station group of a single telecommunication provider, may comprise a plurality of base stations 10a or 10b or may alternatively be formed by a singular base station 10*a* comprising at least two antennas 12*a* and 12*b*. Note, that also or advantageously a combination of the two configurations, namely a base station system 100 comprising the two base stations 10*a* and 10*b*, each base station comprising at least two antennas 12*a* and 12*b*, may be possible. This base station system 100, which is configured to receive and transmit data via at least two separate antennas, has the purpose to enable transmission modes like spatial multiplexing, space-time coding or beamforming, which allow increased data rates. In detail, due to the two antennas, each antenna configured to use ultra-high frequencies (i.e. frequencies in a range between 0.1 and 6 GHz, referred to as band 1 in the sequel), two backend communication signals (comprising backend uplink signals (and/) or backend downlink signals) to the SUDA system 200 may be transmitted.

The ultra-high frequency signals of the first and the second backend communication signals typically interfere with each other, so the first and second backend communication signals are represented by a superposition of the ultra-high frequency signals transmitted via a first and a second carrier. The two backend communication signals are transmitted by the base station system 100 such that the parallel data streams may be split-able under the condition that both ultra-high frequency signals are known. This technique of independently and separately transmitting of encoded data signals is called spatial multiplexing.

According to an alternative approach, the base station system 100 uses at least three antennas in order to perform beam forming for generating two beams so as to transmit a backend communication signal to a first position, e.g. the position of a SUDAC (cf. reference numeral 210) and a further backend communication signal to a second position, e.g. of the UE 20 via two separated beams. Each beam is formed by a superposition of at least two ultra-high frequency signals transmitted via the three antennas. As explained, the beam forming may be used for the downlink (BS 100→UE 20), wherein also beam forming for the uplink is possible, when, for example, the uplink backend signal (UE 20→BS 100), is transmitted via a plurality of SUDACs, e.g. 10 SUDACs, forming one or more beams as a superposition of a plurality of the ultra-high frequency signals output by the SUDACs.

According to an alternative approach, the UE 20 uses its built-in antenna plus at least one SUDAC in order to perform beam forming so as to establish a backend communication link to a BS 100 via a beam that is formed by a superposition of two ultra-high frequency signals transmitted from the UE's built-in antenna and the SUDAC.

According to an alternative approach, the UE 20 uses its built-in antenna plus at least one SUDAC in order to perform space-time coding so as to reach a higher robustness and thereby higher achievable data rates for a backend link to a BS 100 that is formed by a superposition of two ultra-high frequency signals transmitted from the UE's built-in antenna and the SUDAC.

The described system takes advantage of the fact that the multiplicity of transmit antennas at the base station (i.e. at least partially independent propagation paths from the base station to the cluster of relays) can be associated with the multiplicity of channels (e.g. frequency sub bands) from the cluster of relays to the user equipment (again independent propagation paths). Thus the simultaneous transmission of multiple signals is allowed, i.e. the use of spatial multiplexing.

The data rate increase by using spatial multiplexing necessitates not only two antennas at the transmitter but also two antennas at the receiver, wherein the antennas is advantageously arranged spaced apart from each other. The data rate increase by using space-time coding or beamforming necessitates two antennas at the transmitter and at least one antenna at the receiver (known as MISO). The system 200 forming the counterpart to the base station system 100 comprises also at least two antennas so that data may be exchanged, e.g. by using spatial multiplexing, between the two systems 100 and 200, wherein exchange means transmit and/or receive (i.e. the transmission modes spatial multiplexing, space-time coding and beamforming may be used for the downlink and for the uplink).

The counterpart system 200 referred to as SUDA system 200 comprises at least two SUDACs 210 and 220, each SUDAC 210, 220 comprises a frequency and multiplexing converter 212 and 222. The frequency and multiplexing converters 212 and 222 are coupled to separate antennas 216 and 226. Here, the antennas 216 and 226 may be integrated into the first and second SUDACs 210 and 220 or may be external antennas connected to the frequency and multiplexing converters 212 and 222 via respective antenna interfaces 214 and 224. The SUDACs 210 and 220 and thus the SUDA system 200 has the purpose of forwarding the data signals received via the backend communication links to the user equipment 20 or to transmit the data signals received from the user equipment 20 to the base station system 100 via the backend communication links. In order to exchange data signals to be received or transmitted via the SUDA system 200 the SUDA system 200 or, in more detail, the two SUDACs 210 and 220 are connected to the user equipment 20 via so called frontend links (as seen from the user equipment) using frontend communication signals. Therefore each frequency and multiplexing converter 212 and 220 is coupled to a respective short range radio antenna 218 and 228, respectively, via which the frontend communication links are established. The short range radio communication antennas 218 and 228 are configured to use extremely high frequencies, e.g. frequencies in a range between 1 and 300 GHz or advantageously between 30 and 100 GHz. To sum up the backend links make use of frequency Band 1, for instance sub-6 GHz bands, while the frontend links employ Band 2, which could be mm-wave.

In order to establish the frontend communication links between user equipment 20 and the SUDA system 200, the user equipment 20 has a short range radio communication antenna unit comprising one antenna or an antenna array which is configured to receive and transmit such extremely high frequency signals. These mm-waves enable that the resources for two frontend links may be selected such that the data signals transmitted via the two frontend links are separable.

The resources to be varied are frequency (f), time (t), code (c) and space (s) for these frontend links and are chosen in order to avoid interferences between the singular frontend links. The resource variation is performed by the UEs 20*a* and 20*b* and by the configurable SUDACs 210 and 220. For example, two different carriers for the frontend communication links may be used (in order to use FDM/FDMA multiplexing/multiple access) or two different time slots for transmitting the first and the second data signal via the two frontend links may be used (in order to perform TDM/TDMA multiplexing/multiple access). Alternatively, the two data signals between the SUDA system 200 and the user equipment 20 may differ from each other due to the used code in order to perform CDM/CDMA multiplexing/multiple access. Another alternative way to choose the f-t-c-s-resources such that same are differentiable from each other is to perform SDM/SDMA multiplexing/multiple access, e.g. by using beamforming for the frontend communication links. For example, due to the differently chosen t-c-s-resources in the frontend, also referred to as band 2, the frontend links may be transmitted in the same frequency band. In order to change the time-resources and to perform TDM/TDMA multiplexing, SUDAC 210 and 220 may comprise a memory in order to store a signal received in a first time slot (e.g., 0 to 100 µs) and to output the signal delayed in a second time slot (100 to 200 µs). Optionally, Time-Division-Duplexing (TDD) or Frequency-Division-Duplexing (FDD) may be used. Note for FDD that the assignment of a SUDAC to UE A (observe that a SUDAC can be assigned to more than one UE, i.e. it relays more than one signal) can be for downlink only, for uplink only or for both, according to the channel quality and the service requirements (e.g. TV broadcast necessitates only a downlink); for TDD the assignment is done for both.

The linking between user equipment 20 and the SUDACs 210 and 220 may be described with other word in that way that each SUDAC 210 and 220 is informational coupled to the user equipment 20 so as to be used as a distributed antenna array. This enables the user equipment to receive two data streams from the two antennas 216 and 226 sent by the base station system 100 so that the two antennas 216 and 226 form a virtual antenna array (VAA) having distributed antennas enabling to receive spatial multiplexed data signals or two data signals transmitted by using beamforming from a base station system 100 (downlink) or vice versa to transmit two spatial multiplexed data signals or two data signals by using beamforming to the base station system 100 (uplink). In the case of inbound signals (downlink), the two data signals from the base station system 100 are combined within the user equipment 20 so that a high data rate resulting from the aggregated first and second data signal is achieved. In case of outbound signals (uplink), the two data signals transmitted via the two antennas 216 and 226 are transmitted such that beamforming or spatial multiplexing is enabled in the backend band having ultra-high frequencies (also referred to as band 1). Consequently that means, that the user equipment 20 accesses the cellular network represented by the base stations 10*a* and 10*b* via the SUDA system, i.e. using at least a first SUDAC link and a second link, that can be another SUDAC link or direct link between the user equipment and the base stations, and a first and a second cellular network link (backend).

Starting from this system overview, it is clear that the two SUDACs 210 and 220, or in more detail the two frequency and multiplexing converters 212 and 222, have two fundamental functions: The first function is to perform a frequency converting such that the carrier used for the band 1 is down converted to a carrier used for the band 2 (extremely high frequency band) or vice versa (up converting band 2 to band 1). The next function is that the frontend resources and the SUDAC functionality is assigned to connected user equipments such that their service requirements (e.g. data rates) are satisfied as much as possible. A third function is that the data signals exchanged via the frontend links are multiplexed such that interferences between the plurality of frontend links are avoided. Therefore, each frequency and multiplexing converter is configured to choose the frequency-time-code-space-resources for the frontend links accordingly as described above. It should be noted that the data signals amplified and forwarded by the frequency and multiplexing converters 212 and 222 can be forwarded without decoding, where the signals either remain in the analog domain or are sampled, digitally processed (e.g. band-filtered) and converted to the analog domain. In a second embodiment the signals are compressed-and-forwarded in the downlink, i.e. sampled and digitally processed (e.g. compressed) and modulated (possibly including encoding) using a second air interface. In the uplink, the signals are decoded-and-forwarded, i.e. the second air interface is demodulated, any compression is reverted and the payload is converted to the analog domain (without prior encoding).

Although the SUDA system 200 has been described in the context of a system comprising at least two frequency and multiplexing converters 212 and 222 which are housed in separate housings, it should be noted that two frequency and multiplexing converters 212 and 222, which have a common housing and are coupled to two antennas 216 and 226 which are advantageously arranged spaced from each other, may form a ("mini") SUDA system. Here the controller may be implemented into the housing or may at least be informational coupled (e.g. via the control channel) to the mini SUDAC. In this case, the two short range radio antennas 218 and 228 may be formed by a common short range radio antenna or antenna array, because due to the proper chosen of the f-t-c-s-resources two frontend links may be established in parallel by using just one short range radio antenna 218/228.

Figure 1B:
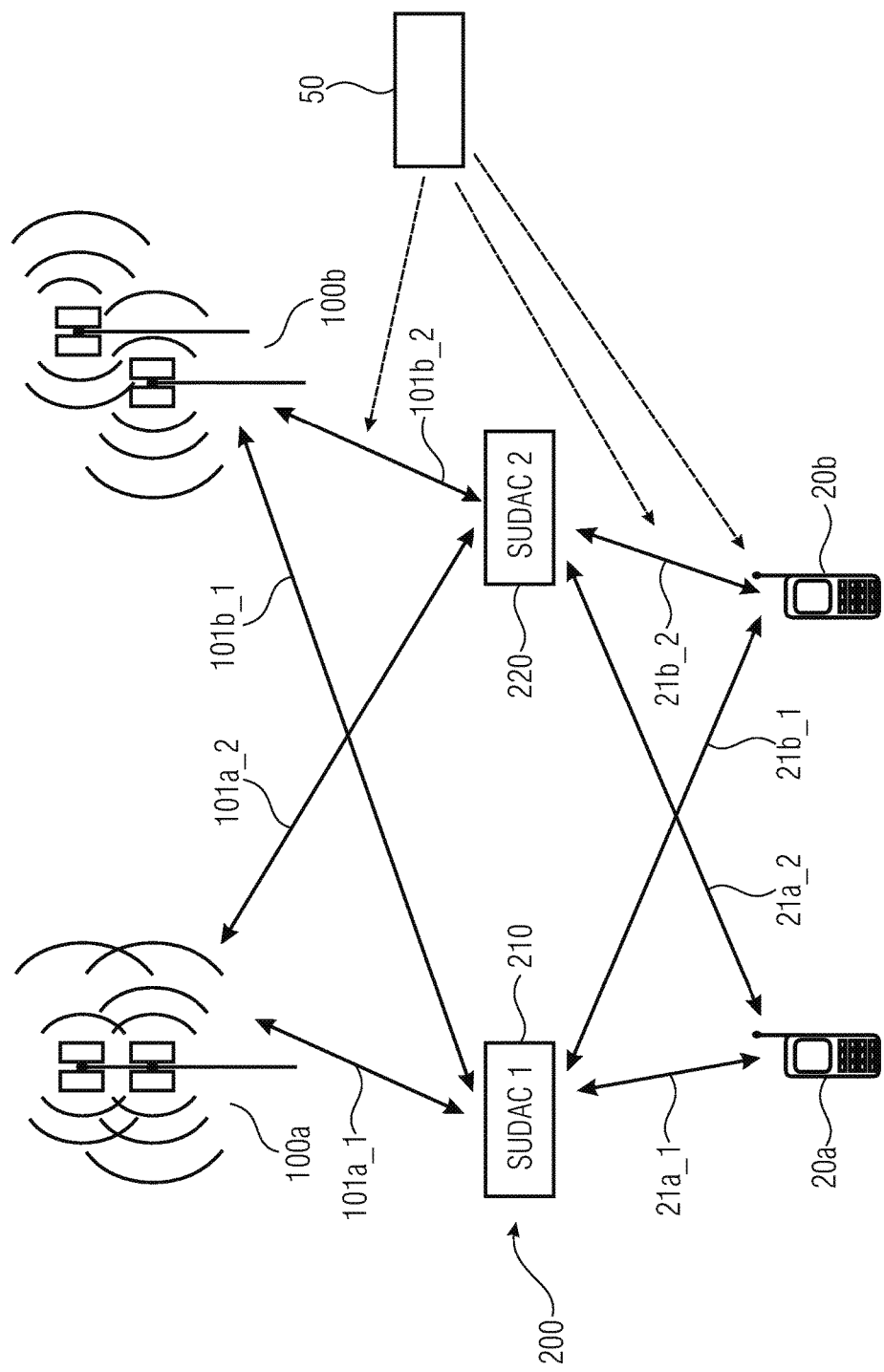
FIG. 1b shows an enhanced implementation of the system of FIG. 1a controlled by a controller according to a first embodiment.

The time-frequency-code-space-resources are chosen by using a controller (c.f. FIG. 1*b*), which may be implemented in the user equipment 20, the SUDA system 200 and/or the base station system 100. The controller is configured to control the singular SUDACs 210 and 220 so that the at least two frontend links are established and differentiable due to the f-t-c-s-resources (see above). Furthermore, the controller may be configured to vary the f-t-c-s-resources for the band 1. The f-t-resources of the band 1 may, for example, be chosen such that a first backend link uses the 800 MHz carrier, wherein a second backend communication link uses the 850 MHz carrier. These resources of the band 1 and the band 2 are adapted in view of the circumstances (available base stations, available SUDACs, number of user equipments, quality of the link between a SUDAC and a user equipment at a potential f-t-c-s resource (e.g. carrier frequency) and/or necessitated data rate for each user equipment). Moreover, the controller 50 may take into account the capabilities of the concerned SUDACs 210 and 220, the user equipments 20 and the base stations 100, e.g. how many carriers they are able to transmit and receive, what carrier frequencies are supported in Bands 1 and 2, what is the minimum or maximum frequency separation of two carriers, what is the max. transmit power, how fast can a SUDAC switch the carrier frequency etc. In order to analyze the circumstances, the controller may optionally comprise an analyzer which is configured to analyze the circumstances based on channel measurement or evaluation of channel state information (CSI) and/or based on measurements done during a training sequence. This controlling means may be implemented into an algorithm or in general into an method comprising the steps of adjusting the f-t-c-s resources.

Starting from the above discussed concept it becomes clear that the main challenge of the concept is to assign the resources or, in more detail, the frontend transmission resources and the HW resources of the SUDACs to the user equipments 20. A further challenge is to organize the f-t-c-s resources such that the plurality of frontend signals and the corresponding plurality of backend signals do not disturb each other. This becomes more challenging in case a plurality of user equipments 20 try to use the SUDA system 200 for the communication to the base station system 100. For example, the organization of the resources may be organized by the base station or at least by using the base station.

However, in case a plurality of base station groups, e.g. of a plurality of different telecommunication providers, want to use the one SUDA system 200 for establishing communication links to a plurality of user equipments which may be assigned to the different base station groups, there is the need for an improved approach. This improved approach will be discussed below with respect to FIG. 1*b*. Here, the second frontend link established via the second frontend communication signals is referred to as second frontend link using second frontend communication signals, while the first frontend link established via the first frontend communication signal is referred to as first frontend link using first frontend communication signals in order to distinguish these links more clearly. The same notation is used for the backend signals (first backend communication signal and second backend communication signal)

FIG. 1*b* shows a first base station system group 100*a* and a second base station system group 100*b*, two user equipments 20*a* and 20*b* and a SUDA system 200 connecting the respective base station system groups 100*a*/100*b* with the user equipments 20*a*/20*b*. As indicated by the letter a of the reference numerals, the user equipment 20*a* belongs or is assigned to the base station system group 100*a*, wherein the user equipment 20*b* belongs or is assigned to the base station system group 20*b*.

Consequently, the SUDA system 200, here implemented as a combination of two SUDACs 210 and 220, has the purpose to forward frontend signals from the first user equipment 20*a* via backend signals to the first base station group 100*a* and to forward backend signals from the first base station group 100 via frontend signals to the first user equipment 20*a* as well as to forward frontend signals from the second user equipment 20*b* via backend signals to the second base station group 100*b* and to forward backend signals from the second base station group 100*b* via frontend signals to the second user equipment 20*b*. In detail, the first user equipment 20*a* uses a first frontend signal 21*a*_1 to the first SUDAC 210, which converts the first frontend signal 21*a*_1 to a first backend signal 101*a*_1, and a second backend signal 21*a*_2 to the second SUDAC 320, which converts this second frontend signal 21*a*_2 to a second backend signal 101*a*_2 (or vice versa) for communicating with the first base station group 100*a*. Note that the first and the second backend signals 101*a*_1 and 101*a*_2 do not necessarily have the same source or destination, i.e., that the base station system group 100*a* may comprise a plurality of base stations being in connection with the SUDA system 200, as explained with respect to FIG. 1*a*. The second user equipment 20*b* uses for communicating with the second base station group 100*b* at least the first frontend link 21*b*_1 to the first SUDAC 210 and a first backend link 101*b*_1 via the first SUDAC 210. Additionally, the second user equipment 20*b* may use a second frontend link 21*b*_2 and a second backend link 101*b*_2 to enable an increased bandwidth, as discussed above.

As can be seen due to the complexity of the plurality of frontend links 21*a*_1, 21*a*_2, 21*b*_1 and 21*b*_2 and of the plurality of backend links 101*a*_1, 101*a*_2, 101*b*_1 and 101*b*_2a solution for controlling the respective resources regarding time, frequency, code and/or space as discussed with respect to FIG. 1*a*, for the plurality of links has to be organized.

Therefore the system illustrated by FIG. 1*b* comprises a controller 50 configured to perform the controlling of the resources for the frontend links 21*a*_1, 21*a*_2, 21*b*_1 and 21*b*_2 as well as the controlling of the resources of the backend links 101*a*_1, 101*a*_2, 101*b*_1 and 101*b*_2.

In detail the controller 50 enables to control all resources in the frontend as well as potentially the resources in the backend for all entities using the SUDAC 200, i.e., for the entities belonging to the first base station group 100*a* and for the entities belonging to the second base station group 100*b*.

The controller 50 is configured to control the resources regarding time, frequency and code as well as regarding space by selecting the respective SUDAC 210 or 220 for a user equipment, e.g. 20*a* such that the singular frontend links 21*a*_1, 21*a*_2, 21*b*_1 and 21*b*_2 and the respective backend links 101*a*_1, 101*a*_2, 101*b*_1 and 101*b*_2 belonging to different base station system groups 100*a* and 100*b* do not disturb each other or, in more detail such that the two backend links 101*a*_1, 101*a*_2 or the two backend links 101*b*_1 and 101*b*_2 use overlapping resources to perform MIMO. Therefore, the controller 50 should be enabled to get access to the user equipments 20*a* and 20*b* in order to select the resources at the user equipments 20*a* and 20*b* get access to the entities 210 and 220 of the SUDA system 200 in order to define the parameters according to which the respective backend links 101*a*_1, 101*a*_2, 101*b*_1 and 101*b*_2 are converted to respective frontend links 21*a*_1, 21*a*_2, 21*b*_1 and 21*b*_2 and vice versa. In other words that means that each SUDAC 210 or 220 may be configured to serve a plurality of UEs 20*a* and 20*b* (or at least one UE), e.g. if different time slots are assigned to the different frontend channels or by another type of resource allocation defined by the controller 50.

The controller 50 may use a so called control channel established by using the SUDA system 200 for getting access to the singular entities 20*a*, 20*b*, 210 and 220. This control channel may be implemented as a channel having a predefined frequency and/or using a certain time slot and/or using dedicated (spreading) codes, such that each entities is enabled to get access to this control channel independent from the assignment of a user equipment 20*a* to a base station group 100*a* or 20*b* in combination with 100*b*. Optionally, the controller may also have access to the base station groups 100*a* and 100*b*. For such a use case it may be more beneficial to implement the controller 50 as central controller somewhere in the network formed by the base station system 100, the SUDA system 200 and the plurality of user equipments 20, since the control channel enables that the controller 50 may be implemented in an entity, for example in a user equipment 20*a* and can control the resources for all other user equipments 20*b* as well as the resources of the SUDA system 200.

According to an embodiment, the controller 50 may be implemented as a shared controller, i.e., within the plurality of user equipments 20*a* and 20*b*. Implementation of such a shared controller is that the controller is implemented as a protocol or an algorithm executed via the control channel.

According to a further embodiment, the controller 50 is configured to analyze the demands of the single user equipments 20*a* and 20*b* as well as the circumstances, e.g. an available signal strength and noise or interference level of the user equipment 20*a* and 20*b*. Based on this analysis the controller changes the distributed resources, e.g. in that way that singular frontend and backend links, e.g. the second frontend link 21*b*_2 and the second backend link 101*b*_2 are enabled and disabled.

Although, aspects of the invention have been described in context of an apparatus, it is clear that the invention also refers to a corresponding method performing the controlling, wherein the method steps or at least some method steps may be performed by a CPU executing the control algorithm. The first implementation of the control method comprises the steps of selecting the first resources and the second resources into account data rate requirements and/or data rate capabilities of the first and/or second user equipment (20, 20a, 20b) and/or of the first and/or second base station network group (100a, 100b) and/or such that the first frontend communication signals 21a_1 and 21b_1, converted to respective first backend communication signals 101a_1, and 101b_1, as well as the second frontend communication signals 21a_2 and 21b_2, converted to respective first backend communication signals 101a_2, and 101b_2, are distinguishable from each other and/or such that transmission losses caused by interferences within the first frontend communication signals 21a_1 and 21b_1 and the second frontend communication signals 21a_2 and 21b_2 are reduced. Thus, the controller may be configured to detect the interferer based on information available at the control channel.

Figure 1C:
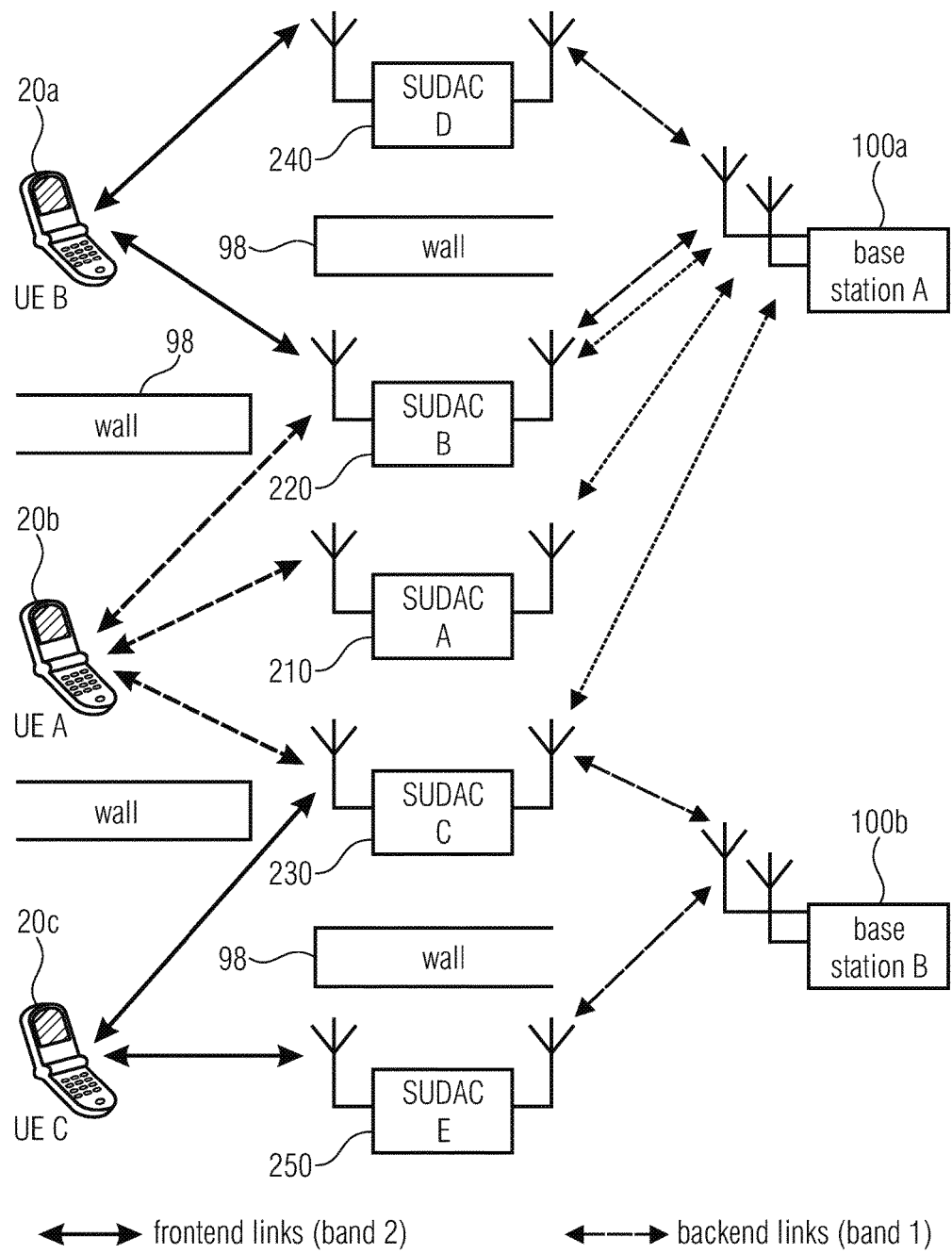
FIG. 1c shows a further use case of the controller of FIG. 1b according to an embodiment.

According to a further embodiment the SUDA system 200 may comprise an additional SUDAC (not shown) which may be used by singular user equipments 20a or 20b, for example, if link quality to the additional SUDAC is higher when compared to a link quality to the SUDAC 210 and 220. Thus, the controller 50 may be configured to distribute the relevant resources such that each user equipment 20a and 20b has a good available link quality. Optionally, controller 50 may be configured to control the transmission power of an UE or a SUDAC for the frontend links to improve the link quality. In general that means that the controller 50 may additionally be configured to take into account the quality of the frontend links and also the backend link quality. For example, if the frontend link quality is good and the backend link quality is bad, then the overall link quality is bad and the relay should not be used for the communication between base station and UE, i.e. that the frontend link allocation is based on a joint consideration of the frontend and backend link qualities. Reasons for the varying link quality may be a movement of the user equipment 20a and 20b. Such an exemplary situation is shown by FIG. 1c. The controller having access to all relevant information provided by the devices of the system (UE, SUDAC and/or BS) enables carrying out actively resource allocation not only based on the links that the device sees itself, but also based on further links (e.g. the UE takes into account that the SUDAC sees further UEs, and that these further UEs see further SUDACs).

According to an embodiment the controller 50 maintains a table where it stores the channel quality metrics (further details below) at various s6G (downlink and uplink) backend channels gained from earlier connections; these values had been given to the SUDAC by the associated UEs during these connections; moreover, the table contains time stamps about when the quality was measured. Here, the quality metric is calculated for a (downlink or uplink) backend channel by the UE by measuring the quality for the complete channel (i.e. backend+frontend) and the quality of the frontend channel (using pilot channels between UE and SUDACs) and calculating from both the quality of the backend channel. As the metrics concern only the backend channel (BS to SUDAC) and both are at fixed locations and propagation conditions at sub6G frequencies are not very sensitive to people or furniture being moved around, it can expected that these metrics remain fairly constant over a longer time span.

According to an embodiment the controller informs the base stations about which potential backend channels a UE employing a SUDAS could use, e.g. when the SUDACs have limited support of backend frequency channels. Based on this information, the base stations can carry out the backend resource allocation for the UE.

FIG. 1c shows a SUDA system 200 comprising five SUDACs, two base station groups 100a and 100b and three user equipments 20a, 20b and 20c, wherein not each user equipment 20a, 20b and 20c is enabled to get access to each SUDAC due to the presence of walls 98.

For the below example, it is assumed that Frequency Division Duplexing (FDD) is used and that the frontend has sufficient resources for at most 2 SRD links per UE and SUDAC (e.g. two different frequency sub-bands or two different time slices), where each link has the capacity to transport either a downlink or uplink signal. The system implements a 2×2 VMIMO system to each UE in down- and uplink, where one direct link between base station and UE exists and where the UEs only possess a single antenna for Band 1. Hence, each UE has to establish one additional downlink over a SUDAC and one additional uplink over a SUDAC. Each UE sees two SUDACs, the middle one is seen by both UEs, the other two SUDACs are seen only by one UE (thanks to blockage of the Line-of-Sight propagation by a wall 98). Now assume that all frontend links have approximately the same quality, while the backend link between SUDAC 2 and the base station is significantly better than for the links between SUDACs 1 and 3 and the base station. If only UE 1 is present at the beginning, it could occupy SUDAC 2 completely, which offers good backend link quality. When UE 2 then joins the system and when, for example, an aforementioned simple individual resource allocation is used, UE 2 can only use SUDAC 3 for both its down- and uplink, and has therefore to accept the inferior backend link quality. On the other hand, SUDAC 1 remains completely unused. There is hence a strong imbalance on the overall link qualities (frontend and backend) between UE 1 and UE 2.

As can be seen due to FIG. 1c the controller controlling all entities using the SUDA system 200 enables a more fair resource allocation could choose instead. However, for such a resource allocation, UE 1 has to take into account the backend link quality between SUDAC 3 and the base station, even though UE 1 does not use this SUDAC and does not even see it. Observe that a topology as shown in FIG. 1c might sometimes have advantages, e.g. when Multi-User-MIMO is used and the channel matrices should be as uncorrelated as possible. This can of course be taken into account in a joint consideration of frontend and backend links as well. Here resource allocation is done in a dynamic and flexible way into account appearance and dropping of devices, variations in the necessitated link properties (bandwidth, number of carriers or resource blocks etc.), and changing propagation conditions (e.g. someone moving between rooms).

The configurability of the system having dedicated reconfigurable SUDAC devices allows full flexibility with the number of UEs, SUDACs (e.g. in a large open-plan office) and base stations involved in the system. UEs and base stations of multiple network operators can be part of the system, possibly even non-cellular communications signals (like TV signals) could be relayed by the SUDACs (and a UE would be a TV in this case). Observe that each individual base station can use multiple carriers (carrier aggregation).

Bellow a possible way for entering an available SUDAC network will be discussed, referring to FIG. 1c: In Case a UE A 20a wants to use new SUDACs 210-250 (e.g. starting operation, or moving from one room, that possibly contains SUDACs, to another room with other SUDACs) and starts to scan for and contact the surrounding SUDACs; these SUDACs fall into two groups: free and busy SUDACs (assuming that each SUDAC can provide one downlink and one uplink relay paths); or rather free and busy SUDAC relay paths (downlink and uplink), if a SUDAC is used only for downlink or uplink. UE A can contact both free and busy SUDACs and request the backend channel quality metrics from their internal table together with the time stamps; based on the time stamp and the current time, UE A 20a can decide whether any quality metric is still up-to-date or outdated; in the first case, the UE can set up an order of the most promising SUDACs that it now wants to contact to get the current channel quality metrics.

In the next step, the UE A contacts free SUDACs and tells them, which down- and uplink backend channels, i.e. s6G frequencies, it wants to communicate over. Each free SUDAC 210-250 and UE A 20a scan for available frontend channels with good SNIR (good propagation conditions and low interference); for measuring these frontend channel quality metrics, the SUDACs communicate with the UE over these channels (at least using pilot channels and control data); the SUDACs 210-250 communicate the identified candidate frontend channels and their quality metrics to UE A 20a.

Advantageously, but not necessarily SUDACs initially measure only power in the desired backend channels and use that as a quality metric for initial radio resource management (RRM) of backend links: Background thereof is that SUDACs shall be cheap; thus, channel estimation for each individual backend link (using orthogonal sets of pilots for each MIMO transmit antenna) could cost too much complexity in a SUDAC; it can be expected for spatial multiplexing (i.e. not beamforming) that the sum power received from the BS (before the BS actually starts using MIMO precoding for UE A) is a good measure for the aptitude of the SUDAC to relay signals from/to this BS (it reflects well whether the SUDAC is shadowed); in case of TDD, the uplink backend channel quality metric is approximately the same thanks to channel reciprocity and small time-variance on the non-mobile backend links (see above); it is beneficial that only a single simple parameter needs to be measured for each backend channel, instead of a complete row of the MIMO channel's H-matrix as in conventional algorithms.

Bellow an possible control concept for the uplink, e.g. using FDD with SUDACs the above channel quality metric, will be discussed, wherein the discussion is made on the assumption that the controller is integrated into the UE A: Here, the UE A uses the SUDAC for a trial connection to the BS; BS measures (frontend and/or backend) channel quality on the uplink (now the channel quality metric can be, e.g., the complete row of the MIMO channel's H-matrix) and feeds it back to UE A. Moreover, UE A can obtain a more reliable and detailed (frontend and/or backend) channel quality metric (e.g. rows of the H-matrix) from the downlink of this trial connection. In case of busy SUDACs (e.g. already connected to a UE B 20b), UE A contacts busy SUDACs and tells them, which backend (i.e. sub6G) down- and uplink channels it wants to communicate over. The SUDAC informs UE A which channel(s) it is currently relaying (downlink and uplink). For downlink and uplink that means that if it is the channel(s) desired by UE A, then the SUDAC forwards the backend channel quality metric of the corresponding down- and uplink channel(s) that was measured by UE B 20b which is currently using this SUDAC; the UE A 20a can share the downlink and uplink relay with UE B, as the BS 100a/100b can assign different (time-frequency-code) resource blocks to the two UEs (even different spatial resource blocks are possible, when MU-MIMO is used by the BS).

According to an embodiment the UE A can measure the frontend channel quality from the pilot channel and control data exchanged with the SUDAC. Otherwise, i.e. if the currently relayed channels are different from the desired ones, then the SUDAC can possibly measure the quality metric of the desired downlink or TDD channel during a time slot, when it is idle for the connection to/from UE B; for this to work, UE B has to inform the SUDAC, when such idle times occur. These idle times can moreover be used to measure quality metric of other frontend channels to UE A different from the currently used one. The same applies for the next two options. Otherwise, if possible, the connection for UE B is re-configured for a short time (this includes exchange of control data with the BS of UE A and of UE B (it is potentially two base stations in different mobile networks)), such that the SUDAC becomes idle during this short time and can do the quality measurement for the desired backend channel for UE A (for down- and uplink). Alternatively, the desired data rates and the currently available data rates (in downlink) of UE A and B are considered according to some policy (e.g. whether UE A has some priority over UE B, or whether desired data rates up to x Mbit/s have priority over desired data rates above that), and it is decided whether the considered SUDAC remains with UE B or is given (at least temporarily) to UE A. The information necessitated for this decision is either collected in UE A or in UE B, i.e. one UE provides all information necessitated to the other UE through relayed control information by way of the SUDAC. The SUDAC and the other UE is afterwards informed about the decision. The other UE accepts this decision as its own interests have already been taken into account in this decision.

Based on the metrics gained so far (i.e. those from SUDAC-internal tables from earlier connections, those from free SUDACs and busy SUDACs, for backend and frontend channels), a selection is made by UE A for the ensemble of UE A and all other UEs, which are currently using one of the busy SUDACs, about which of the (free and busy) SUDACs (and its downlink/uplink relay paths) contacted by UE A is assigned to which UE(s) 20a-20c and accordingly, which desired backend channel shall be relayed, which frontend channels a SUDAC assigned to UE A shall use and at which power the SUDACs and the UEs shall transmit in the frontend. At any one time the algorithm is not distributed over multiple devices and the UE A can do the power selection on its own. Besides the quality metrics of the backend and frontend channels seen by UE A (downlink and uplink), this selection is based on the quality metrics of the currently used backend and frontend channels of the other UEs and those for the free SUDACs surrounding these UEs (i.e. UE A knows the channel quality of its own channels towards the BS as well as those of the other UEs towards their BSs), the desired data rates and the currently available data rates of the concerned UEs (incl. UE A) and some policy (e.g. whether UE x has some priority over UE y, or whether desired data rates up to x Mbit/s have priority over desired data rates above that). The information necessitated for this decision is collected in UE A, i.e. the SUDACs and the other UEs provide all information necessitated to UE A through relayed control information by way of the SUDACs.

UE A communicates the decision/selection back to the surrounding SUDACs and the other UEs by way of the SUDACs; the other UEs accept this decision, as their own interests have already been taken into account by UE A in this decision. Moreover, the UEs regularly inform their SUDACs about the downlink and uplink quality metrics of their backend channels; the SUDACs store these values in the internal table mentioned before. Further, the UEs inform their corresponding BSs about the approaching event, when their (V)MIMO channel properties will be changed (i.e. when the current configuration is changed, be it adding/removal of SUDACs to a UE, changing the frontend (or backend) link frequency etc.). This non-centralized scheme works not only for communication between BSs and UEs but also for other sub6G communications like TV broadcasting.

After such an initial RRM (when a UE A enters a SUDAS system 200), each UE can regularly initiate an update of the allocated resources (e.g. every 100 ms). I.e. each UE starts a new round of RRM according to the scheme described above. Hence, multiple non-disjoint sets of UEs and SUDACs (all SUDACs and UEs that are neighbors to the considered UE) exist, where the RRM is individually optimized for all links within such a set. This is hence a distributed optimization algorithm, where the optimization occurs not simultaneously for each set but sequentially. The aforementioned rounds are hence iterations in the algorithm that lead to an improved overall resource allocation. Possibly, this algorithm does not converge but oscillates, but it can be expected that the average data rate (over time) per UE is close to a good stationary resource allocation. This scheme allows an adaptation also when the propagation conditions of a UE change significantly, e.g. when it is moved to another room containing other SUDACs, or when an obstacle like a human body causes signal shadowing. Some of the information exchange from/to the SUDACs could alternatively be carried out over special control backend channels to/from a BS.

Expressed in other words, the described algorithm takes into account the complete situation within a UE neighborhood, and moreover, it also takes into account the desired and available data rates including the frontend links between UE B and SUDAC D and between UE C and SUDAC E, and the backend link between SUDAC D and BS A and between SUDAC E and BS B. Further, the algorithm may take into account that simply "robbing" a SUDAC from another UE could degrade its performance tremendously.

According to an embodiment the controlling may be performed such that multiple carriers at the backend may be used in order perform carrier aggregation or to enable the parallel usage of multiple base stations within a same mobile network (known as Coordinated MultiPoint—CoMP). Further, the frontend resources are selected such that multiple carriers may be used for the same user equipment (carrier aggregation). Also multiple carriers may be used by multiple user equipments. Additionally the allocation of SUDACs and frontend channels for the same mobile network may be carried out, for example, such that some SUDACs and channels are allocated to UE 1 and others to UE 2 on purpose to realize MU-MIMO. This represents an alternative to allocating the same frontend channels to both UEs, where the frontend links are separated by allocating different t-f-resources. Further, the controller may select the channel's resources such that errors caused by carriers by foreign systems (interferers, like a WGig system) are avoided.

Referring to FIG. 1a it should be noted that the system 40 may comprise one or multiple (at least 2) base stations 10a/10b, each equipped with multiple transmit and receive antennas 12a/12b, multiple SUDAC devices 210/220 and one or multiple user equipments 20, where a base station 10a/10b transmits and receives data to/from a user equipment 20 in Band 1. (Observe that this means that the final destination/source of the data is the base station 10a/10b and the user equipment 20, while in this example there is no direct link for signals in Band 1 between both). The main advantage of the system 40 is that the advantages of cellular communication (sub-6 GHz, favorable wave propagation even at NLOS conditions) and frontend communication (mm-wave, large bandwidth available) are combined in order to avoid the drawback of sub-6 GHz communication that the user equipment size is prohibitive for a large number of antennas at adequate spatial separation.

A further embodiment refers to a method for exchanging the data between 12a/12b and 20: For the downlink, the SUDAC 210/220 frequency-converts the backend signals received in Band 1 to a channel of Band 2 and relays them to a frontend link (known as amplify-and-forward). For the uplink, a SUDAC 210/220 frequency converts the frontend signal received in a sub band of Band 2 to Band 1 and relays it to a backend link. The frequencies of the sub bands to be used on the frontend links for transmission and reception are selected by the controller, such that they avoid interference between the signals associated with each SUDAC 210/220 to/from the user equipments 20 in downlink and uplink, and moreover avoid the interference from other systems, like W-Fi or Bluetooth.

Figure 1D:
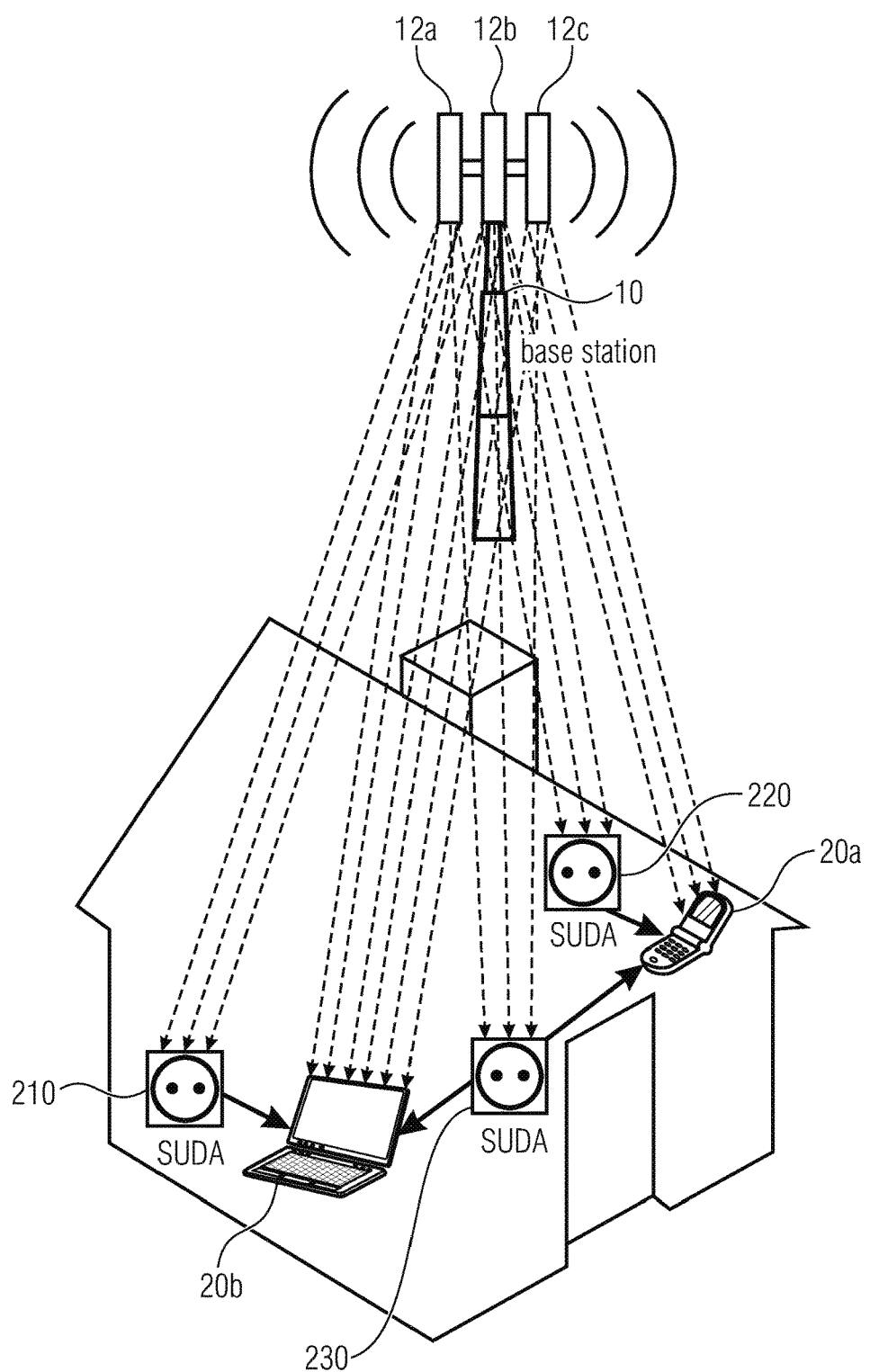

FIG. 1d shows dedicated devices termed SUDACs 210, 220 and 230 placed in many locations in a room or house. Each SUDAC 210, 220 and 230 may be battery-powered, mains-powered or powered by solar or wind energy. It may be a dedicated stand-alone device or it can be integrated into various electrical devices like electrical wall outlets/sockets, electrical light outlets, electrical switches, distribution boxes, electrical extension cables or sockets, electrical blinds, street lamps/posts, electrical lamps, computers and/or electrical devices of all sorts, including outlet adapters that provide an output socket. A so formed SUDA system may be referred to as "scattered infra-structure" in or for the home. It can moreover be integrated into the roof or the sides of a car, a bus/coach, a train or other vehicles. Specifically, SUDACs can be integrated into user equipments. They receive and transmit signals from and to the base station in the sub-6 GHz band, and they forward them to the user equipments 20a, 20b in their vicinity and receive their return signals in the mm-wave bands, respectively. More precisely, for the downlink the signal received from the base station 10 in each SUDAC 210, 220, and 230 is a superposition of the (spatially multiplexed) signals from all the antennas 12a, 12b, and 12c of the base station 10. The SUDACs 210, 220, 230 are not able to separate this superposition but processes and forwards it as a whole to the user equipments 10a, 10b. Similarly, for the uplink, the user equipments 20a, 20b prepare the signal, which shall be transmitted from a SUDAC 210, 220, 230 towards the base station 10, and transmit these signals to all SUDACs 210, 220, 230. This signal is a superposition of component signals which together provide spatial multiplexing between the ensemble of SUDACs 210, 220, 230 (or rather the corresponding user equipment 20a, 20b) and the base station 10

Several SUDACs together form a Shared User equipment-side Distributed Antenna System (SUDAS) 200. Bellow, the radio links between the user equipments 20a, 20b and the SUDACs 210, 220, 230 will be denoted as the frontend links and those between the SUDACs 210, 220, 230 and the base station 10 as the "backend links". According to further embodiment, the one or more user equipments 20a and 20b may be configured to establish an additional backend communication link to the base station 10 directly, as illustrated by the direct paths between the base station 10 and the user equipment 20a and 20b. This enables to additionally increase the data rate. These links make use of the same frequency Band 1 as the backend links. Due to the fact that two frequency bands (band 1 and band 2) are used, i.e. separating the two links terminating at the user equipment 20a/20b by frequency, effectively avoids interferences between the direct path and the relayed path and thus improves the system performance significantly. The user equipment 20a and 20b (pre-) processes this signal received/transmitted in Band 1 jointly with the frontend receive/transmit signals in the channel(s) of Band 2 (MIMO processing, i.e. MIMO decoding and MIMO preceding, respectively).

Band 2 might be partitioned into several sub-bands when multiple signals shall be transmitted in parallel. Such a transmission thus represents a form of frequency division multiplexing or frequency division multiple access (FDM/FDMA). Well-known alternatives to FDM(A) is time division multiplexing (access) TDM(A), code division multiplexing (access) CDM(A) and space division multiplexing (access) SDM(A). In order to accommodate all these different types of multiplexing or multiple access, the term "resources" is used to denote all resources in the time-frequency-code-space signaling space; here space (in the sense of spatial multiplexing) represents all possible signaling space dimensions that can be offered by physical antennas, e.g. to be used individually for each signal: polarization, indices of the antenna element, direction (angles in polar coordinates) in case of beamforming, and/or in general (includes the above): preceding parameters (amplitude and phase) for each (polarized) antenna element for beamforming, which leads to a specific antenna directivity characteristic.

In the above embodiment of FIG. 1d, the SUDA system 200 comprising the SUDACs 210, 220 and 230 forms a kind of distributed antenna system, wherein the SUDA system 200 together with the user equipment 20a, 20b prepares a signal which shall be transmitted by the antennas. Similarly, the SUDA system 200 processes all signals that have been received by the individual antennas, wherein the processing of the inbound and outbound signals are typically performed by the user equipment. The advantages of such a distributed antenna system when compared to an undistributed antenna system wherein the antennas are closely located is a significantly larger spatial diversity which allows using a higher degree of spatial multiplexing and thus a transmission at a higher data rate.

According to a further embodiment, base station 10 uses the multiple antennas 12a, 12b and 12c in order to carry out beam forming towards the cluster of SUDACs. The multiple SUDACs cooperate and jointly realize beam forming towards the user equipment and/or the base stations. This technique controlled by the above controller may be called cooperative beam forming.

Figure 2:
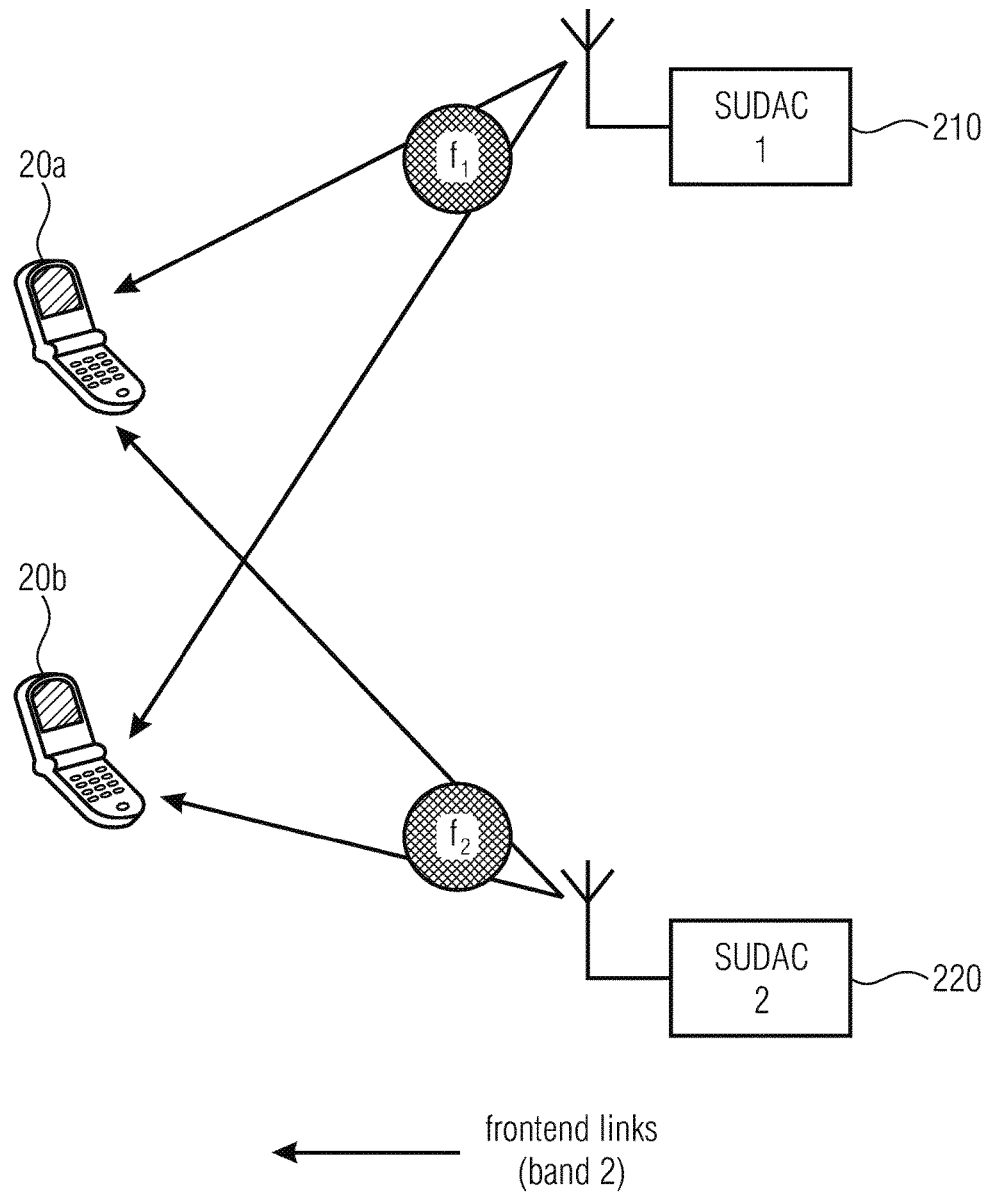
FIG. 2 shows a schematic diagram illustrating a frontend downlink for two SUDACs transmitting on different frequency sub bands to the user equipment.

FIG. 2 shows the downlink in the frontend, when two SUDACs 210 and 220 are present, which transmit towards two user equipments 20a and 20b. SUDAC 210 employs a channel at frequency $f_1$ and SUDAC 220 another channel at frequency $f_2$. For the example of FIG. 1d that means, if the signal attenuation between the SUDAC 210 and the user equipment 20a is large, and if that between the user equipment 20b and the SUDAC 220 is large, too, then these two SUDACs 210 and 220 can use the same frontend resources (e.g. frequency), while the SUDAC 230 has to use a second channel. Otherwise, each SUDAC has to use its own resources, i.e. the SUDACs occupy a total of 3 channels.

Downlink and uplink may use the same resources of Band 2 (if backend downlink and backend uplink use the same frequency, i.e., when time-division-duplexing TDD mode is used by the base station) or different ones (if the backend down- and uplink use different frequencies, i.e., in frequency-division-duplexing FDD mode). In case of FDM(A) in the frontend, a SUDAC transmits only in a single sub band and receives in a single sub band, while the user equipments have to receive and transmit in multiple sub bands. The sub bands to be used by the SUDACs and user equipments in the frontend are assigned by some internal algorithm of the above discussed controller in order to optimize the current transmission/reception performance (avoid interference and collisions with other frontend signals). This algorithm can be based on the result of channel measurements (activity of other transmitters in the same sub band). The user equipment 20a and 20b can detect the sub bands for down- and uplink selected by the SUDAC 210, 220 from its received signal, when it identifies a new SUDAC or a change in the used sub bands.

The user equipment 20a and 20b receives the frontend signals in the channels of Band 2 and processes them jointly (MIMO detection, for example: Maximum Likelihood or MMSE detection). Similarly, the user equipment can in one use case preprocess multiple uplink signals jointly (MIMO precoding, for example: spatial multiplexing, space-time-coding or beam forming) and transmit them on the frontend links, or—in a second use case—transmit multiple transmit signals in these frontend links without such preprocessing. Observe that the frontend part of the uplink between any user equipment and any SUDAC can be a Single-Input-Single-Output (SISO) link. Hence, the MIMO preprocessing, that the user equipment employs for the uplink signals in the first described use case, becomes effective only when the SUDACs relay these signals towards the base station(s).

Referring to FIGS. 3a to 3d, enhanced embodiments, or the application of the above embodiments to different situations will be discussed.

Figure 3A:
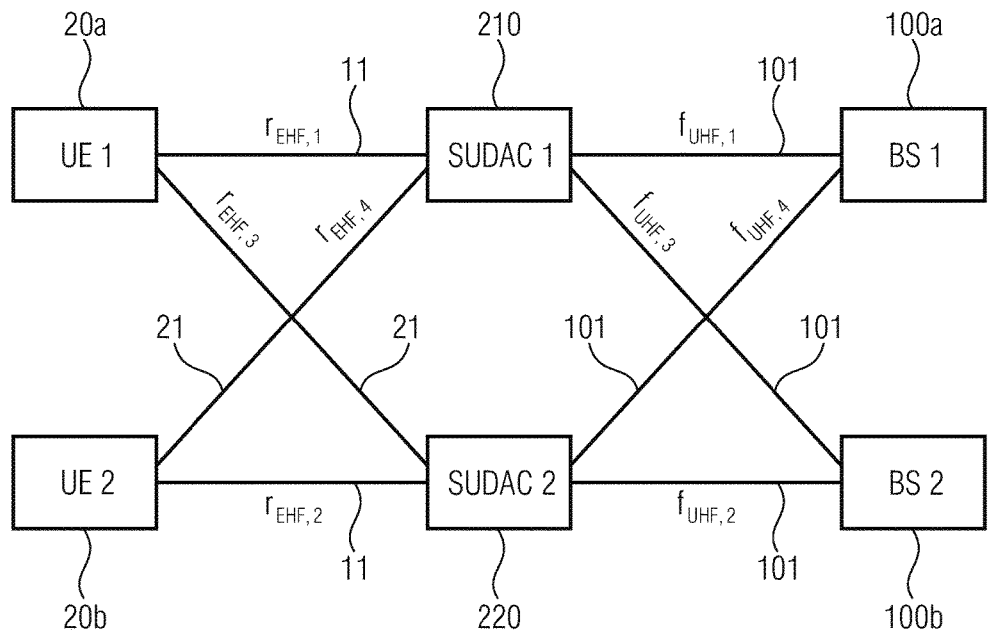
FIGS. 3a-3d show schematic block diagrams illustrating different scenarios (combination of UEs, SUDACs and BSs) of the above embodiments.

FIG. 3a shows the situation as already described in the context of FIG. 1b using a different illustration. In detail, FIG. 3a shows a communication system comprising the two user equipments 20a and 20b, the two SUDACs 210 and 220 and the two base station groups 100a and 100b.

The frontend links are marked by the reference numerals 21 or $r_{EHF,1}$, $r_{EHF,2}$, $r_{EHF,3}$ and $r_{EHF,4}$, wherein the backend communication links are marked by the reference numerals 101 and $f_{UHF,1}$, $f_{UHF,2}$, $f_{UHF,3}$ and $f_{UHF,4}$. The functionality of the described system complies with the functionality of the system of FIG. 1b. It should be noted that this system, especially the frontend communication links, are controlled using the controller, although is not illustrated by FIG. 3a.

Figure 3B:
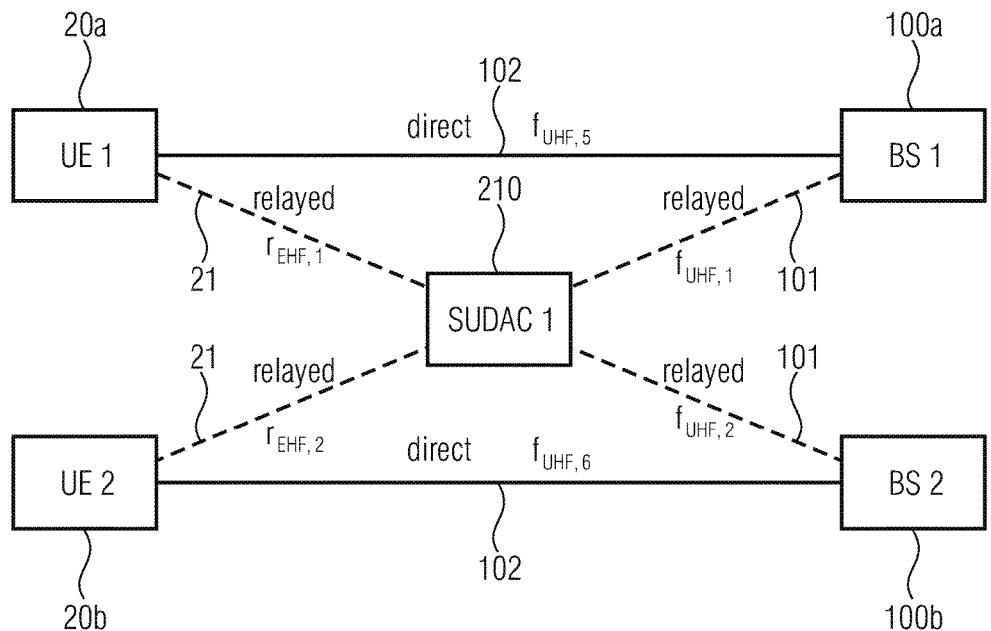

FIG. 3b shows the modification of the system of FIG. 3a, wherein just one SUDAC 210 is in use. Here, the user equipment 20a stays in communication with the base station 100a via a relayed communication link using the SUDAC 210 and via a direct communication link (marked by the reference numeral 102 or $f_{UHF,5}$) which may be a conventional LTE or 3G connection, i.e. using ultra high frequencies. Accordingly, the second user equipment 20b is connected to the base station 100b via a direct communication link 102/$f_{UHF,6}$ and via a relay communication link using the SUDAC 210. Here, the frontend communication links 21/$r_{EHF,1}$ and $r_{EHF,2}$ as well as the backend communication links 101/$f_{UHF,1}$ and $f_{UHF,2}$ are illustrated by broken lines to make it clear that the resources, for example the time resources, are actually allocated such that the respective relayed links are not active. This means that the relayed communication links using the SUDAC 210 are disabled, at least for the respective time slot, by the controller, but will be enabled for the purpose of increasing the data rate for the respective user equipment 20a or 20b.

Figure 3C:
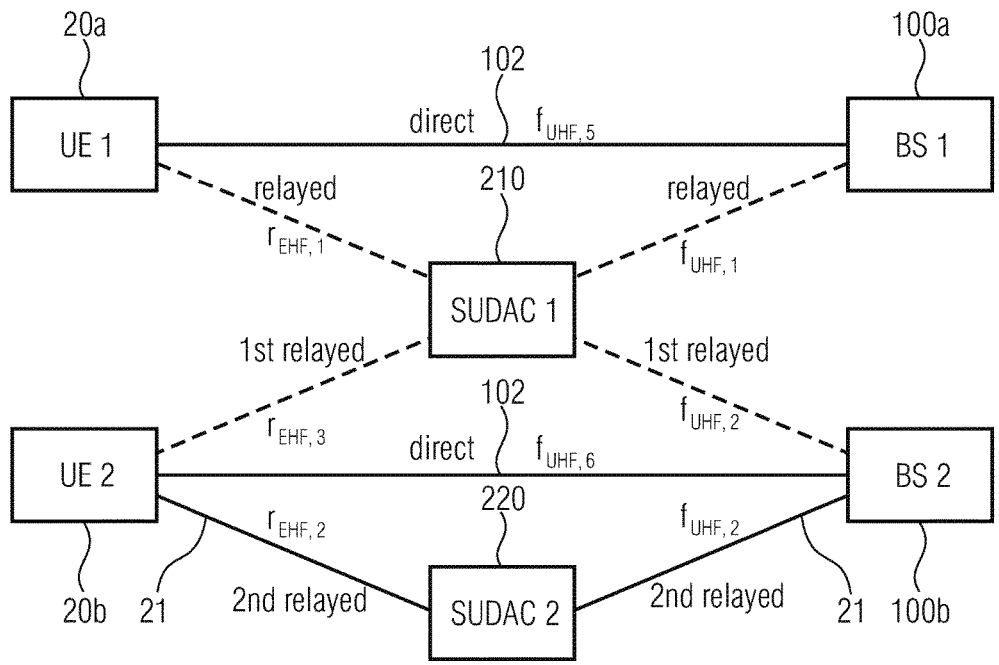

FIG. 3c shows a situation in which the first user equipment 20a is directly connected to the first base station 100a and in which the second user equipment 20b uses a direct link and the relayed link via the second SUDAC 220 for the communication to the second base station 100b. As illustrated by the broken lines the relayed links via the SUDAC 210 are not active, but may be available for the first and second user equipment 20a and 20b if necessitated, e.g. in case high data rates are necessitated.

Figure 3D:
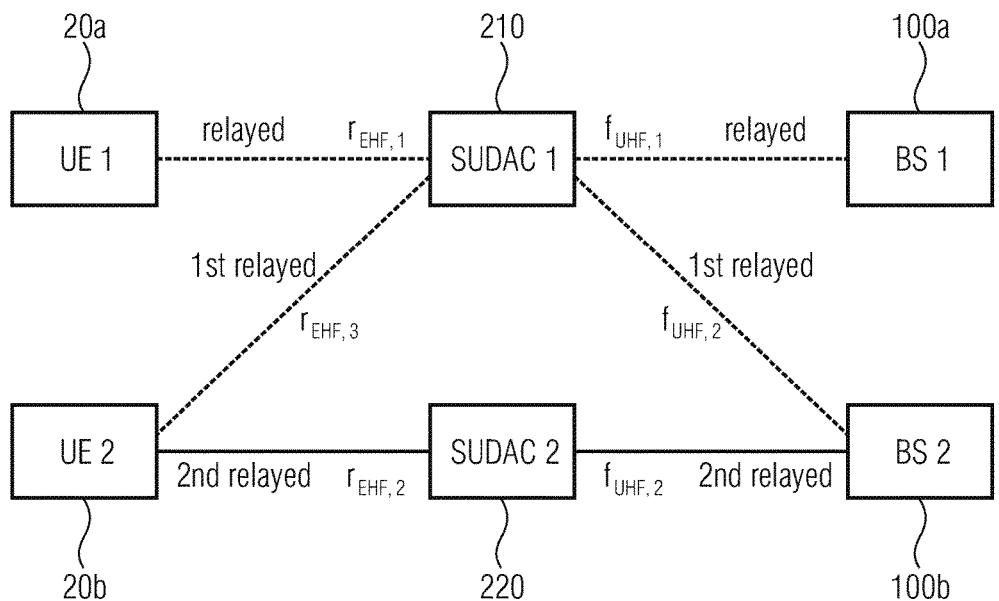

The transfer of the resource allocation regarding the time resources to the embodiment of FIG. 3a is illustrated by FIG. 3d. Here, the second user equipment 20b uses the relayed connection to the base station 100b via the second SUDAC 220, while all frontend and backend connections of the first SUDAC 210 are not active. In case the user equipment 20b needs a higher data rate the relayed connection using the SUDAC 210 may be enabled, but advantageously not when the relayed connection between the first user equipment 20a and the first base station 100a using the first SUDAC 210 is active.

In general, the controller performs the resource allocation for all situations (cf. FIGS. 3a to 3d) such that a fair distribution of the available data rate is achieved. For example, the controller controls the resources such that a direct link is used for a first user equipment in case a second user equipment needs a high data rate which can be achieved using two SUDACs. Furthermore, in case both user equipments necessitate a similar data rate and in case the direct link between the second user equipment and the second base station is better than the direct link between the first base station and the first user equipment, then the controller controls the resources such that the first user equipment uses the relayed links, while the second user equipment uses the direct links.

Figure 4:
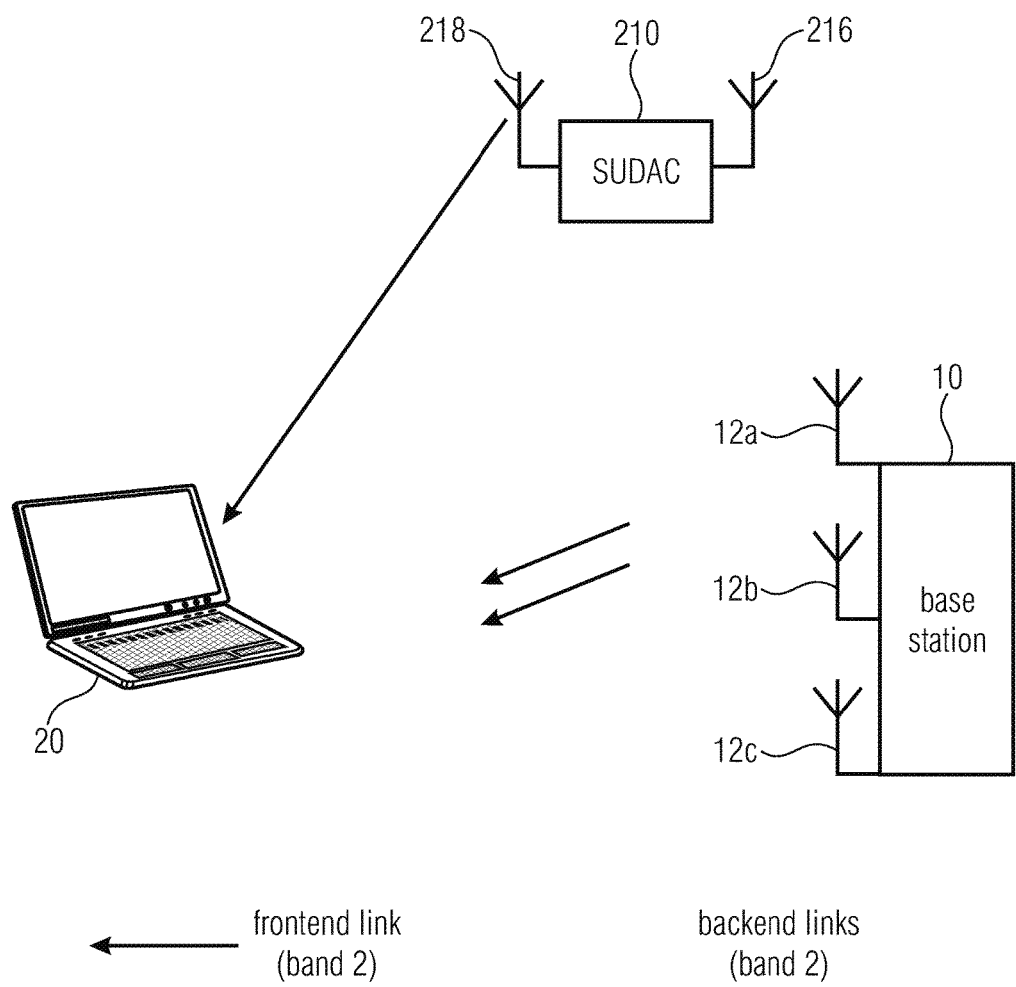
FIG. 4 illustrates a 3×3 MIMO downlink for a single SUDAC and two direct links from base station to the user equipment.

FIG. 4 shows a downlink for such a system with a single SUDAC 210 and a single user equipment 20. Observe that the base station 10 possesses 3 transmit antennas 12a, 12b and 12c. The SUDAC receives a superposition of all three backend signals. Similarly, the user equipment 20 receives superpositions of all three backend signals. If the user equipment possesses two receive antennas (not shown), the SUDAC and the additional frontend link (relaying the superimposed signal composed of the three base station transmit signals) create a 3×3 MIMO system between the base station 10 and the user equipment 20 and allow the use of three-fold spatial multiplexing.

Note that the SUDAC functionality can be integrated into a user equipment, i.e. besides the original user equipment functionality, such a device contains a functionality to act as a SUDAC for other user equipments.

Figure 5A:
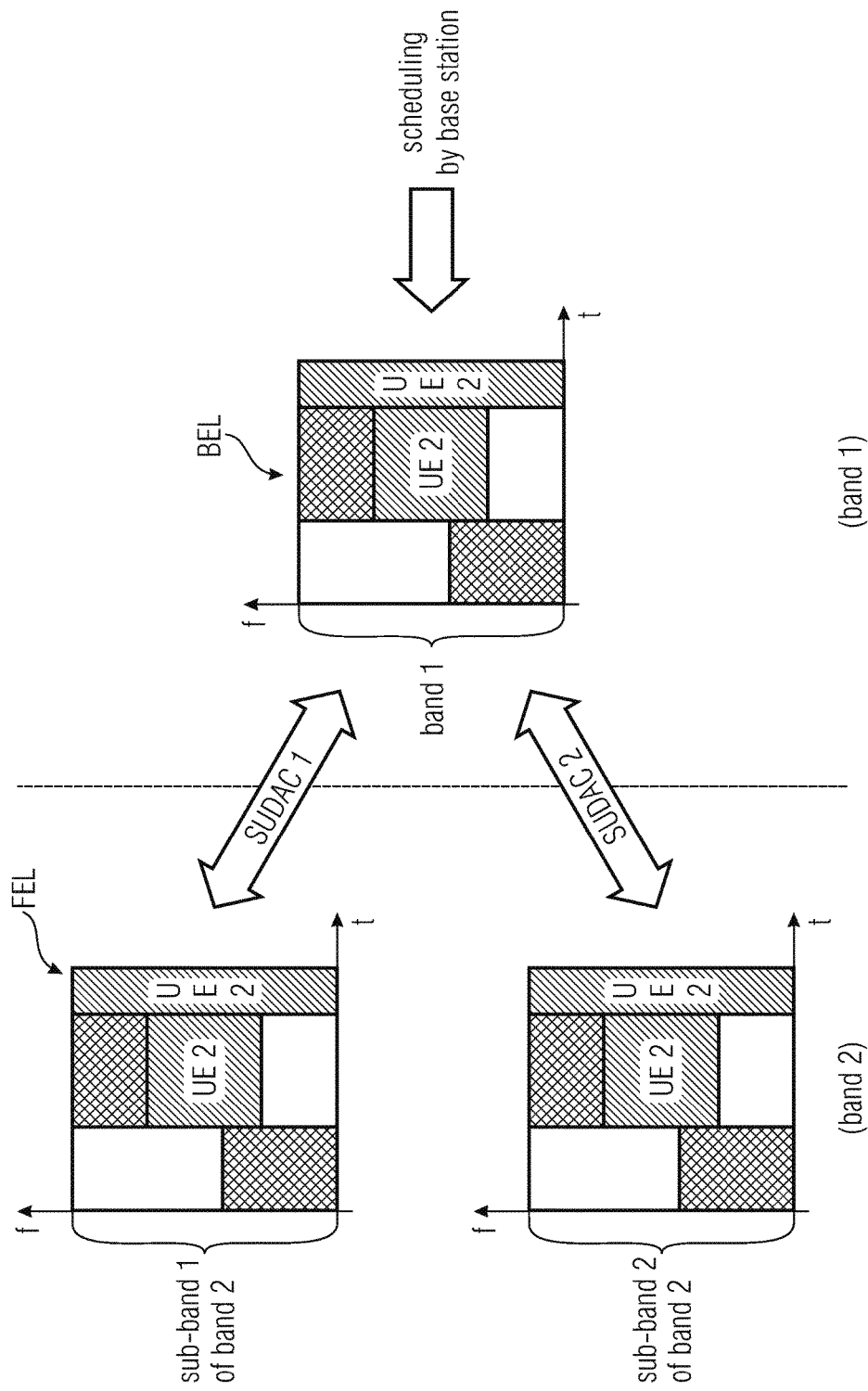
FIG. 5a illustrates the determination performed by a base station, how to schedule the time-frequency-resources in the backend (downlink and uplink)

Multiple user equipments are able to share the same frontend resources in the uplink, as their transmission is scheduled by the base station(s) and thus collisions are avoided, see FIG. 5a. In the sequel, a distinction is made between the scheduling or resource allocation carried out by the base station (side marked by BEL) and the allocation of the frontend (i.e. Band 2) resources to the individual SUDACs for the downlink and uplink, i.e. where SUDACs and user equipments transmit in Band 2 (side marked by FEL). The former will be referred to as base station resource allocation or base station scheduling, while the latter is termed the SUDACs resource allocation. In FIG. 5a, the SUDACS resource allocation is simply: sub band 1 for SUDAC 1 and sub band 2 for SUDAC 2. Inside each SUDAC's resource (here: sub band) the base station resource allocation appears again.

Observe that several SUDACs may be located in the same location and even be integrated into a single physical device. However, each SUDA component, inside such a compound device still carries out the simple handing-over between an antenna signal (in Band 1) in the backend link and a signal in one frontend link (of Band 2) both in downlink and uplink directions.

In case of having multiple user equipments in use, different channels (in case of FDM(A) sub bands) can use each SUDAC, while multiple user equipments share the same channel. This is possible for a SUDAC as the base station ensures collision-free use of the frontend links by its scheduling of the user equipments on the backend links, see FIG. 5a.

Figure 5B:
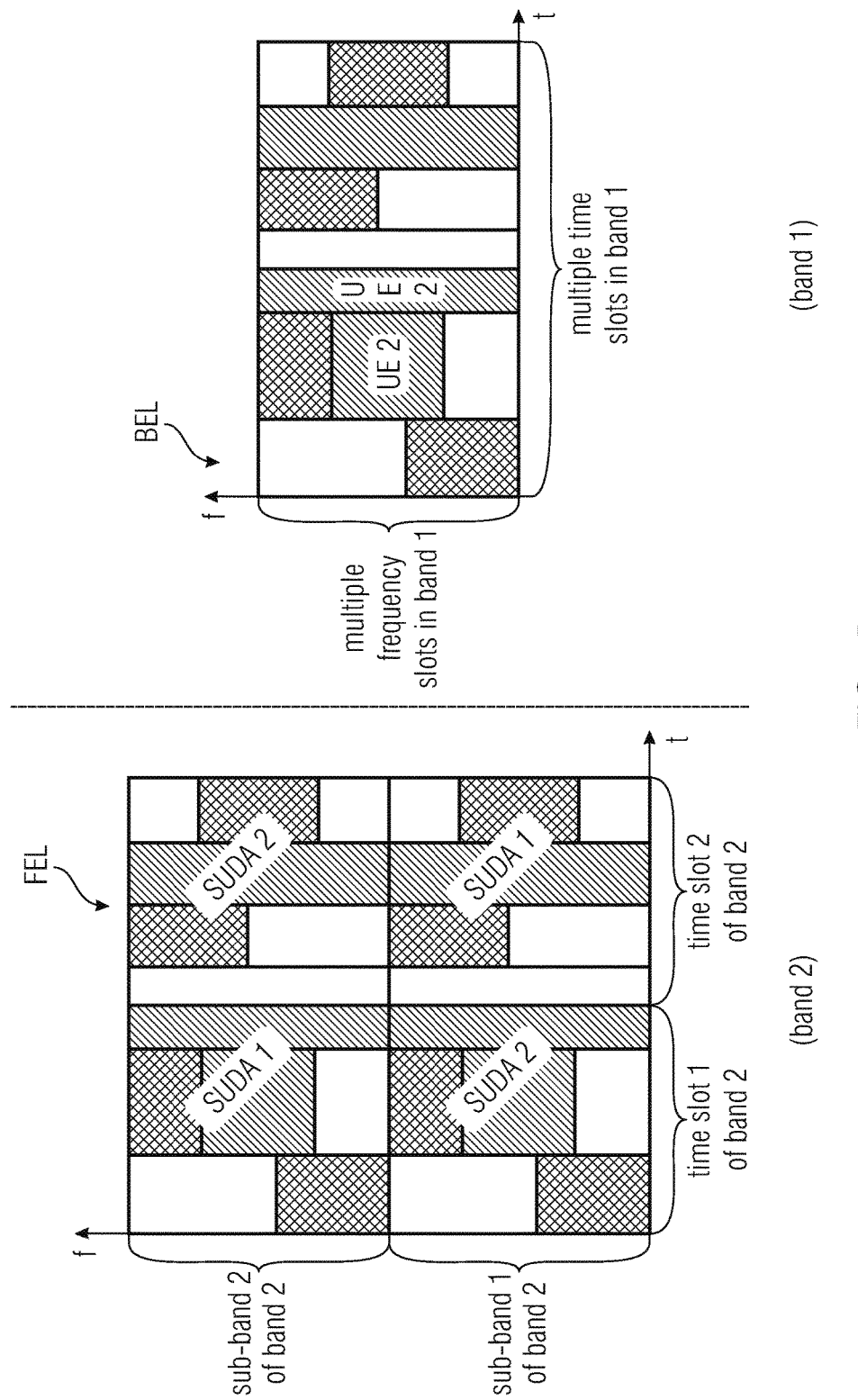
FIG. 5b illustrates the resource allocation between the base station and the SUDACs for two user equipments and two SUDACs (valid for downlink and uplink)

FIG. 5b illustrates an example for changing the f-t-c-s resources, where a SUDAC may employ specific frontend resources (of Band 2) in time, frequency, code and space domain, e.g. a sub-band only during specific time slots. Such a t-f-c-s resource allocation may be fix (e.g. time slot 1 of sub-band 2) or follow a systematic pattern.

A variant of the above embodiments is represented by the case that several SUDACs have the same downlink and uplink f-t-c-s resources in Band 2 associated with them. This may be useful, when there is a shortage of f-t-c-s resources in Band 2, when there are more SUDACs than necessitated for the spatial multiplexing used by the base stations and if the interference caused by this resource sharing remains at a tolerable level. In fact, the resource sharing does not need to be detrimental for the achievable data rates, as the resource sharing creates a multi-path propagation channel as seen from the user equipment (at least for amplitude-and-forward techniques), which can achieve a higher spatial- and frequency-diversity than each link in the non-shared case.

In general for the described embodiments, it could prove useful not only to select the employed f-t-c-s resources but also allocate the power to be used in each forward and return link. For instance, the signals transmitted by SUDACs and user equipments over frontend links with higher attenuation may use a larger power than those transmitted over better frontend links. In the case of resource sharing, the system could reach higher data rates by reducing the power of some frontend signals while increasing that of others, which re-use the same resource.

Figure 6:
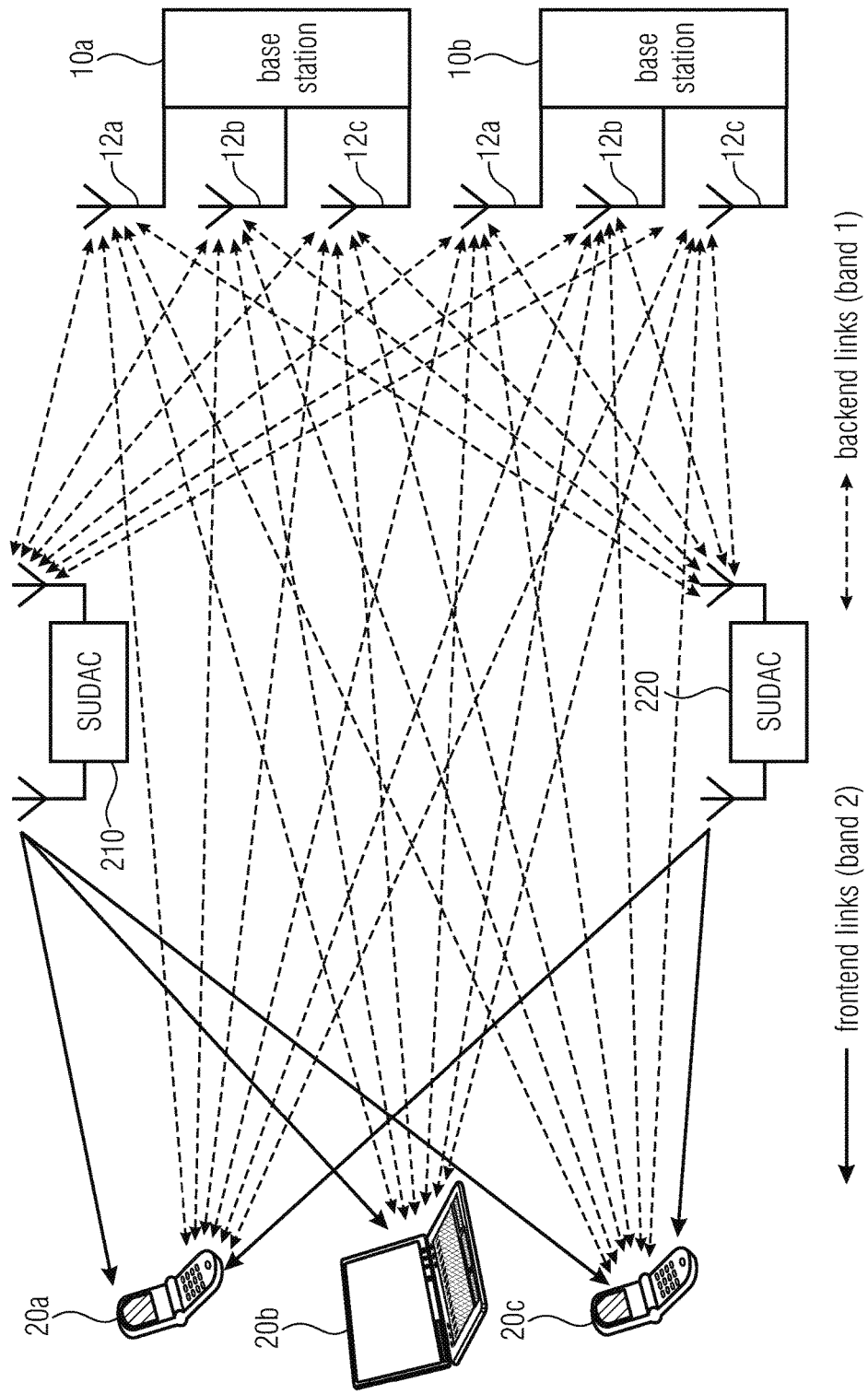
FIG. 6 illustrates the downlink for a system with multiple base stations, multiple SUDACs and multiple user equipments, where direct links exist from the base station to the user equipments.

FIG. 6 shows the downlink for a SUDA system having the SUDACS 210 and 220 according to the above embodiments for two base station's 10a and 10b and three user equipments 20a, 20b, 20c, thereof the middle one 20b equipped with 2 receive antennas (needs only one additional frontend link in order to allow 3×3-MIMO) and the other two with 1 receive antenna (need two frontend links).

In a real environment, the topology and propagation conditions of the frontend links can change quite frequently: user equipments enter/leave the location or are switched on or off (i.e. user equipments are appearing or disappearing); SUDACs can also appear or disappear, e.g. when a SUDAC is integrated into a light outlet: when the light is switched on, the SUDAC appears, when it is switched off, it disappears; the propagation conditions of the frontend links can change over time, e.g. when a user equipment is relocated (carried around).

The result of such a change is that the SUDACS's f-t-c-s-resource allocation for frontend uplink and downlink may have to be modified.

In another embodiment of the controller, when a SUDAC needs to use a new f-t-c-s resource for its transmission (this is described for sub bands representing a frequency resource), it can select these resources and its transmission power by sensing the signals received in Band 2 and checking for free f-t-c-s resources or resources carrying only a weak signal. Then the associated user equipments can be informed about the selected resource allocation by way of control signals or simply detect it by analyzing their receive signals.

In another embodiment, each of these user equipments can select its corresponding f-t-c-s resource and power for transmitting over the frontend uplink by one of the following methods: The user equipment can receive appropriate control data or sense the signals received in Band 2 and check for free f-t-c-s resources or resources carrying only a weak signal. Then the user equipment may occupy these resources and adapt its power, and the respective SUDAC can detect this resource allocation by analyzing its receive signal. There can be a known pairing of frequencies/polarizations/spreading sequences/time slots. Thus, when the user equipment has detected the f-t-c-s resources used by the SUDA, it can occupy the corresponding paired resources for transmission. Its transmit power can, e.g., be adapted according to the level of the received signal.

For the case that a user equipment is already working and a SUDAC starts its operation or has identified some other reason for an update of the resource and power allocation, an alternative to the autonomous resource and power selection described above is the use of a handshake protocol. This protocol can include the following communication:

The SUDAC requests a f-t-c-s resource and power allocation (or re-allocation) from a user equipment; the user equipment replies by assigning appropriate f-t-c-s resources and power values to the SUDA.

Alternatively: the SUDAC analyses its received signal, identifies suitable f-t-c-s resources and power values, starts its transmission and informs all surrounding user equipments and/or SUDACs about the allocated resources and powers.

The user equipments and SUDACs may exchange the analysis results about the signals they receive and transmit in Band 2 (i.e. which signals they receive and transmit on which f-t-c-s resources and what are their signal powers, respectively) and/or their proposed new resource and power allocation.

Typically the UE signals the results of the resource allocation to the BSs. Only the details relevant for the BS need to be transmitted, i.e. each UE informs its BS(s) about how many and which backend channels it is able to receive and transmit. This info depends on the available SUDAC relay paths (some SUDACs may have limitations as regards the supported carrier frequency or bandwidth in the frontend).

User equipments may exchange such information immediately between each other, i.e. without going through the SUDACs, on dedicated f-t-c-s resources. The same applies to SUDACs: they may exchange Information without going through user equipments. Such an exchange may be propagated over multiple hops, e.g. from a user equipment to all its connected SUDACs, and further to all user equipments connected to these SUDACs.

The f-t-c-s resource and power allocation may be negotiated interactively over such multiple hops between all participating devices (user equipments and/or SUDACs). Additionally or alternatively, the user equipments and/or SUDACs may use the base stations to exchange information about the SUDACS resource allocation and about the results from analyzing the signals received in Band 2 by the user equipments/SUDACs and their associated SUDACs/user equipments.

The transmission of such protocols can occur out-of-band (i.e. using f-t-c-s resources different from those carrying the data in the frontend link signal) or in-band (i.e. using the same f-t-c-s resources as the data).

Alternatively to the resource allocation scheme described above, the base station(s) may exchange information with the user equipments/SUDACs about the resources employed by the user equipments/SUDACs and their associated SUDACs/user equipments and about the results from analyzing the signals received in Band 1 and Band 2.

In such an embodiment, the SUDACS resources used in the frontend may be allocated by the base station(s) instead of the user equipments and/or SUDACs. Such a SUDACS resource allocation could moreover be carried out in a coordinated manner between multiple base stations, which can belong to the same or different mobile networks. In this case, the SUDACS resource allocation is transmitted from the base station(s) to the user equipments and/or SUDACs either in-band or out-of-band by a sufficiently robust transmission.

In one associated embodiment, the base station(s) allocate the SUDACS resources used in the frontend and transmit information about this SUDACS resource allocation to the user equipments, which forward this signaling information to the SUDACs over frontend links (using in-band or out-of-band transmission).

In a further embodiment, the SUDACS resource allocation can be carried out interactively between the base station(s), the user equipments and/or the SUDACs—possibly over multiple hops as described further above.

Observe that for the uplink, the base station resource allocation (scheduling carried out by the base station(s)) allows the allocation of the same f-t-c-s resources in the frontend uplink to multiple user equipments without the danger of collisions/interference. In fact, each user equipment will occupy only a part of these frontend f-t-c-s resources, and the base station scheduling will ensure that these parts are distinct for each user equipment, see FIG. 5a and FIG. 5b.

Several devices may share the same SUDAC resources for individual signal transmission. E.g. a user equipment may transmit to multiple SUDACs on the same frontend link. In this case, an address transmitted alongside the signal (in-band or out-of-band) can identify the intended recipient (comparable to a MAC address [Medium Access Control Layer]).

In another example, multiple user equipments may transmit towards the same SUDAC at the same frontend resource. In this case, collision detection can be used by the user equipments to initiate a retransmission, if their signals have interfered with each other.

For the aforementioned case, where signaling information is exchanged between the base station(s) and multiple SUDACs/user equipments on the backend links, device addresses (MAC addresses) may be used for the downlink and collision detection far the uplink.

The in-band or out-of-band signaling from a user equipment to the SUDACs may also contain the base station f-t-c-s resources to be used for transmission or reception on the backend links (Band 1), e.g. the (time-frequency) resource blocks as used by LTE. Hence, the SUDAC relays the uplink signal only on these resources over the backend to the base station, and it selectively receives the backend downlink signal only on the designated resources and relays it to the corresponding user equipment on the frontend.

Alternatively, the SUDAC may analyze the base station resource allocation signaling transmitted from the base station and apply relaying between the backend and the frontend signals only to the base station resources assigned to its connected user equipments. This procedure necessitates that this signaling Information can be decoded by the SUDACs. The base station(s) may use a particularly robust (in-band or out-of-band) transmission to ensure sufficient signal quality.

A use case for such a forwarding of the base station resource allocation from user equipments to SUDACs or alternatively for the inspection of the base station resource allocation in the SUDACs is the adaptation of the receive and transmit time periods in case of Time-Division-Duplexing (TDD) from the base station. Another use case arises, if the base station transmits a larger bandwidth than what can be accommodated in Band 2 by all SUDACs inside a SUDACS. In this case, the SUDACs selectively relay only those signals that address their associated user equipments or originate from them. In such a scheme, a SUDAC needs to transmit additional signaling in order to inform the user equipment, which base station resource has been mapped to which SUDACS resource.

Although in above embodiments to SUDACs has been described as units performing an amplify and forward procedure without decoding, the SUDACs may also be configured to perform a so called compress and forward procedure comprising quantization and remodulation in the downlink and a decode and forward procedure comprising demodulation and digital-to-analog conversion in the uplink.

According to an implementation of a SUDA system, an user equipment may form a SUDAC in the following way: the receiving Band 1 signal can on the one hand be used in the user equipment directly and can on the other hand be forwarded to other user equipments over Band 2; similarly the transmitted Band 1 signal can originate from the user equipment itself or can be forwarded from Band 2 signals received from other user equipments.

According to further embodiments the signals in Band 1 are not simply relayed as analogue signals to/from the sub bands of Band 2. Instead, the frontend signal in Band 2 carries a digital representation of the Band 1 backend signal. For instance for the downlink, the Inphase and Quadrature components of the backend signal are sampled, quantized and possibly compressed and FEC encoded in the SUDAC and transmitted over a frontend link. This technique is known as compress-and-forward. Such a frontend signal can occupy a reduced bandwidth compared to the backend signal, e.g. when a higher-order signal constellation is used in the frontend, or robustness can be increased by FEC encoding, i.e. the final signal-to-noise ratio as seen by the user equipment is larger than for a sheer analogue relaying.

According to a further embodiment, each SUDAC may comprise a linear filter configured by some controller algorithm to perform a linear filtering in order to produce the relayed signal or signals. In one use case, two ultra-high frequency downlink signals received by two antennas of the same SUDAC can be combined and transmitted over a single frontend link in extremely-high frequency. This filtering can, e.g., represent maximum-ratio combining. Similarly, for the uplink a single frontend signal can be linearly filtered in two different ways to obtain the first or second backend communication link that is transmitted over the SUDAC's two Band 1 antennas. This filtering can, e.g., represent beamforming.

According to further embodiments each user equipment possesses an antenna array for Band 2 and uses beam forming in Band 2 and/or interference cancellation to transmit/receive to/from the SUDACs instead of using multiple sub bands of Band 2 for downlink and uplink. Possibly, each SUDAC possesses an antenna array for Band 2 and uses beam forming in Band 2 and/or interference cancellation to transmit/receive to/from the user equipments. Observe that this embodiment replaces frequency division multiple access (FDMA) as used in above embodiments by space division multiple access (SDMA). The shape of the beam forming can be statically configured for each user equipment/SUDAC or adapted by some algorithm inside the user equipment/SUDAC in order to optimize the current transmission/reception performance.

According to another embodiment, if the SUDAC possesses multiple band 1 antennas, the user equipment signals to the SUDAC, what these multiple antennas shall transmit (i.e. different data streams or the configuration of, e.g., a linear filter necessitated for beam forming of one or several data streams).

According to further embodiments each SUDAC possesses one or multiple polarized antennas and uses a single polarization in the frontend to transmit/receive to/from the user equipment instead of using beam forming, and/or the user equipment possesses one or multiple polarized antennas and uses a single polarization in the frontend to transmit/receive to/from the SUDACs instead of using beam forming. The used polarization can be statically configured for each SUDAC/user equipment, or it can be assigned by some internal algorithm in the SUDAC/user equipment (acting as transmitter in the frontend) in order to optimize the current transmission/reception performance and can be detected from the signal by the receiver (user equipment or SUDA).

According to further embodiments each SUDAC carries out a spreading in the sense of Direct Sequence Spread Spectrum (DSSS) to the frontend downlink signal (e.g. by multiplication with a spreading sequence of larger bandwidth than the frontend downlink signal) and transmits the so processed signal in Band 2 to the user equipment instead of using multiple sub bands of Band 2. The user equipment carries out the despreading and possibly interference cancellation/multi-user detection of the signals received from each of the connected SUDACs instead of receiving multiple sub bands of Band 2. Instead of or additionally to the downlink, such a DSSS-spreading technique can be used in the frontend uplink instead of transmitting/receiving in multiple sub bands of Band 2, where user equipment and SUDAC exchange their roles compared to the described downlink technique. Observe that this embodiment replaces frequency division multiple access (FDMA) as used in above embodiments by code division multiple access (CDMA). The used DSSS sequences can be statically configured for each SUDA/user equipment, or they can be assigned by some internal algorithm in the SUDA/user equipment (acting as transmitter in the frontend) in order to optimize the current transmission/reception performance and can be detected from the signal by the receiver (user equipment or SUDAC).

According to further embodiments the SUDAC transmits and/or receives the sampled, quantized (and possibly compressed and FEC encoded) representation of the analogue backend signal (Band 1) as a frontend signal only in dedicated time slots in Band 2 to/from the user equipments instead of using multiple sub bands of Band 2. Similarly, the user equipment receives and/or transmits such a digital representation of the analogue backend signal (Band 1) only in dedicated time slots of Band 2 from/to the SUDACs instead of using multiple sub bands of Band 2. Observe that this embodiment replaces frequency division multiple access (FDMA) as used in above embodiment by time division multiple access (TDMA). The employed time slots can be statically configured for each SUDA/user equipment, or they can be assigned by some internal algorithm in the SUDA/user equipment (acting as transmitter in the frontend) in order to optimize the current transmission/reception performance and can be detected from the signal by the receiver (user equipment or SUDA).

Referring to FIG. 1a it should be noted that the user equipment 20 may have only a single antenna, so that the transmission between the SUDA system 200 and the user equipment 20 is a so called multiple input single output transmission (MISO) in the downlink and a single input multiple output transmission (SIMO) in the uplink. In the case of using multiple user equipments, the complete system with simultaneous transmission to multiple user equipments thus represents a multiple user-MIMO (MU-MIMO) scheme, which will be discussed below.

Referring to FIG. 1b it should be noted that the controller 50, which may be implemented as a CPU performing a control algorithm may be integrated into the base station system 100, the SUDA system 200 or the user equipments 20. Alternatively, the controller may be integrated into several units of the whole system 14 so as to form a so called distributed controlling means.

The controller 50 may further be configured to statically assign the f-t-c-s-resources for the band 2 and the f-t-c-s resources for band 1 or to dynamically change the respective resources.

The above discussed controller may optionally be configured to select the f-t-c-s-resources such that interferences to neighboring SUDA systems or further user equipments linked in the SUDA system are avoided. In order to schedule the transmission of multiple data signals to multiple user equipments connected to the cellular network via one or more SUDA systems the respective SUDACs may be configured to exchange control signals via which the resources assigned to the respective user equipments may be controlled. Thus, the above discussed method for controlling the SUDACS may comprise the step of adjusting its used f-t-c-s resource scheduling in band 2 according to the band 2 channel conditions between an ensemble of SUDACs (itself and the neighboring SUDACs) on the one hand and all neighboring user equipments on the other hand, and according to the band 1 channel conditions between an ensemble of SUDACs on the one hand and all neighboring base Stations on the other hand.

Moreover, the adjusting of the used f-t-c-s resource scheduling in band 2 may be according to the volume of the received signal (e.g., the number of samples within a certain time interval) for the served user equipments.

Referring to FIG. 1d it should be noted that alternatively visible light communications (VLC) may be an alternative to be used for the frontend links.

Figure 7:
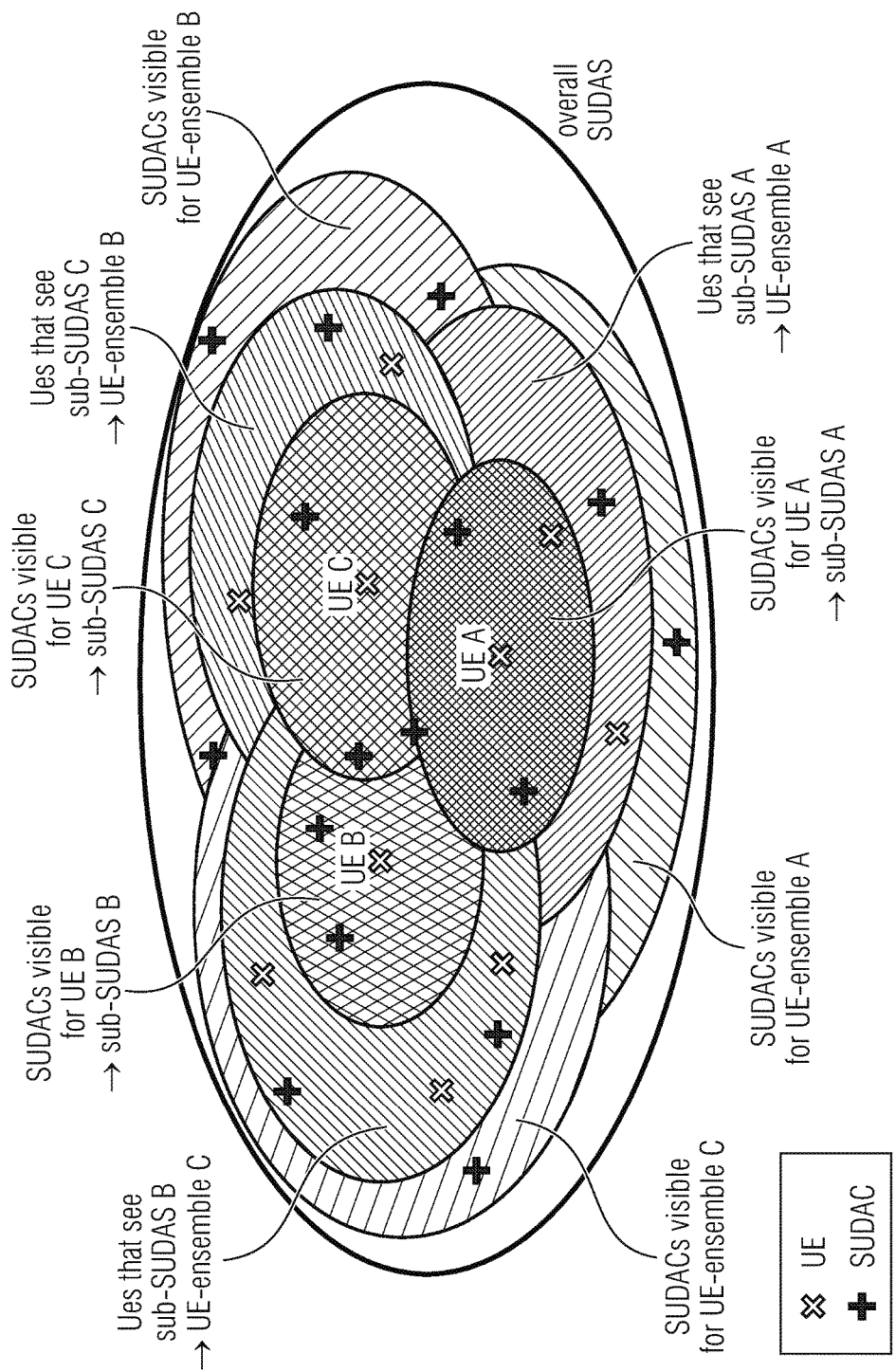
FIG. 7 shows an overview of a plurality of SUDACs and/or UEs having overlapping receiving coverages.

According to a further embodiment a SUDAS is a scattered infra-structure that is remotely controlled jointly by overlapping ensembles of UEs (possibly also controlled by SUDACs and/or BSs), as illustrated by FIG. 7. Here all UEs in an ensemble are close together. As the ensembles are overlapping (not disjoint), there are no clear boundaries between the ensembles. A SUDAS can cover a complete house or even a complete city, and an ensemble could correspond to all SUDACs in a room. However, some of the SUDACs in room A can maybe receive also in the neighboring room B, while others cannot. Hence, these SUDACs belong to the ensemble in room A and also to that in the neighboring room B. That means that a very extended network of SUDACs is controlled by a very extended network of UEs, where a local subset (i.e. ensemble) of the SUDAS (also referred to as a sub-SUDAS, i.e. a sub-system) is predominantly controlled by a UE ensemble surrounding it. Indirectly, even UEs a bit further apart will have an influence on the control (as the resource allocation is a distributed algorithm), but this influence goes down with distance.

This structure of FIG. 7 explains the challenges for the resource allocation. Each UE does not have information about the available SUDACs, channels and propagation conditions of the complete network (or even about all other UEs), hence algorithms are not applicable if they necessitate such knowledge. If such knowledge is to be propagated from each UE throughout the network to each individual UE, then the communication overhead is huge.

According to an further embodiment a SUDAS infrastructure can be used to communicate not only from outside a house (Base Station) to the inside, but also for communication between rooms. Consider the case illustrated in the figure below. A home has an (optical) fiber-to-the-home connection that terminates e.g. in the living room. Hence, there is a femto (or home) base station in the living room that possibly uses 60G communication in order to provide high data rates to all devices inside the living room. However, in order to reach high data rates also in other rooms (e.g. in the home office), 60G communication is not possible as it does not penetrate the walls. Conventional W-Fi will not deliver the desired high data rates, as the MIMO gain is too small (as the femto-BS has at most 4 antennas). However, the femto-BS could communicate to multiple SUDACs in the living room using 60G and transmit a precoded VMIMO signal to these SUDACs, which then relay the signal over a s6G frequency band to the home office. Here, several SUDACs receive the VMIMO signal and forward it over 60G to the UE, which can then carry out the VMIMO decoding. Of course, the same applies in the other direction for the uplink.

Bellow, an further embodiment having multi user MIMO facility will be discussed. Consider the case where two user equipments belonging to the same base station group (mobile network) need to receive and transmit data in parallel and both see the same SUDAC—see FIG. 1b.

Figure 8A:
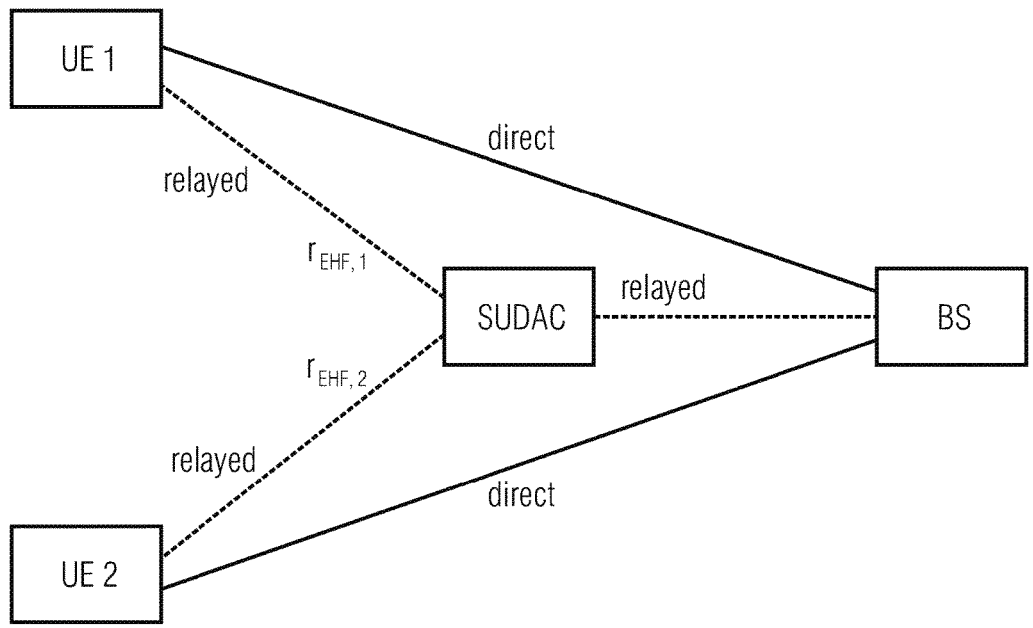
FIG. 8a shows a schematic block diagram of a MU-MIMO system according to an embodiment.

Then there are three options for assignment of the SUDAC to the user equipments and allocation of the backend and frontend resources, as illustrated by FIG. 8a. Here the frontend resources are marked by $r_{EHF,i}$:

According to a first option, the base station group allocates non-overlapping time-frequency-code resources on the backend to both user equipments, i.e. the two user equipments do not receive at the same time/frequency/spreading code (or transmit, respectively). In this case, both user equipments can share the SUDAC or they can possibly use the SUDAC in turns, i.e. for the downlink, the SUDAC relays the backend link to both SUDACs, or at first to SUDAC 1 and afterwards to SUDAC 2 etc. For the uplink a similar principle can be followed. The advantage of this scheme is that the resource allocation and the signal processing both for the user equipments and the base station are quite simple.

According to a second option, the base station group allocates the same time-frequency-code resources on the backend to both user equipments, i.e. the two user equipments receive at the same time/frequency/spreading code (or transmit, respectively), and the SUDAC is assigned to both user equipments simultaneously or to one user equipment for any one transmission slot and can possibly be re-assigned to the other user equipment for the next transmission slot. This means that in any transmission slot, both user equipments have their internal antenna plus the virtual antenna represented by the SUDAC and both can use a N×2-MIMO system, or one user equipment has its internal antenna plus the virtual antenna represented by the SUDAC and can use a N×2-MIMO system with the base station group, while the other user equipment only possesses its internal antenna and can use only a N×1-MISO system. As both user equipments employ the same time-frequency-code resources, their transmissions are only separated in the space dimension by using (virtual) antennas in different locations. Using signal processing in the user equipments, the downlink signals can be separated as long as the downlink to one user equipment consists only of a single spatial stream and the downlink to the other user equipment does not consist of more than two spatial streams, giving a total of max. 3 spatial streams for 3 receive antennas. Such a scheme is called multi-user MIMO (MU-MIMO). The advantage of this scheme is that the signal processing both for the user equipments and the base station is not too complex, and the scheme may achieve higher overall data rates (sum over the two user equipments) than the previous non-MU-MIMO scheme, because all three (virtual) antennas are used simultaneously, hence fully exploiting the space dimension.

According to a third option, the base station group allocates the same time-frequency resources on the backend to both user equipments, i.e. the two user equipments receive at the same time/frequency (or transmit, respectively), and the SUDAC is assigned to both user equipments simultaneously. This means that in any transmission slot, both user equipments have their internal antenna plus the virtual antenna represented by the SUDAC and can use a N×2-MIMO system with the base station group. In this scheme, the downlink to both user equipments consists simultaneously of two spatial streams. As both user equipments employ the same time-frequency resources and partially the same space resources (a shared antenna), their transmissions can only be separated in the code dimension supported by the space dimension. In order to approach the channel capacity, the separation necessitates a kind of multi-user detection—be it linear filtering (e.g. based on the minimum mean squared error-criterion), interference cancellation, maximum likelihood-decoding (e.g. using a sphere decoder), or iterative methods approaching the maximum-likelihood-decoding result. Such a scheme is also a variant of MU-MIMO. While one user equipment only needs to decode its own downlink signal, the second user equipment has to first carry out the same decoding as the first user equipment followed by a second decoding of its own downlink signal, where the result of the first decoding has to be taken into account. When the first user equipment UE 1 decodes its downlink signal, the second downlink signal is considered as interference, and the data rate $R_1$ in the rate region displayed in FIG. 8a can be transmitted over this downlink (or $R_2$, respectively, when UE 2 takes the role of the first user equipment). The second user equipment UE 2 can realize a data rate $R_{2|1}$, which is higher than $R_2$, because the decoded downlink signal of the first user equipment is taken into account and does not represent interference any more (similarly $R_{1|2}$ for UE 1, when the roles of the user equipments are swapped). The (so-called dominant) face of the rate region that is labelled by "$R_1'+R_2'$" can only be reached either by carrying out joint multi-user detection (i.e. decoding both downlink signals jointly instead of sequentially), which represents a significant complexity, or by using a rate splitting approach (cf. Grant, A J.; Rimoldi, B.; Urbanke, R. L.; Whiting, P. A, "Rate-splitting multiple access for discrete memoryless channels," Information Theory, IEEE Transactions on, vol. 47, no. 3, pp. 873,890, March 2001), where a single user equipment is artificially split up into at least two virtual user equipments—each experiencing exactly the same propagation channel, and each assigned a data rate $R_{i,1}$, $R_{i,2}$, . . . , where the total data rate of the user equipment is $R_i'=R_{i,1}+R_{i,2}+$ . . . For the uplink, a similar decoding procedure and rate splitting approach can be used, where the decoding is carried out exclusively in the base station, however. The advantage of this scheme is that it may achieve even higher overall data rates (sum over the two user equipments) than the previous schemes, because both user equipments fully exploit the space dimension simultaneously (both use two (virtual) antennas) and that it is more flexible for assigning a necessitated data rate to the user equipments, as illustrated by FIG. 8b.

Figure 8B:
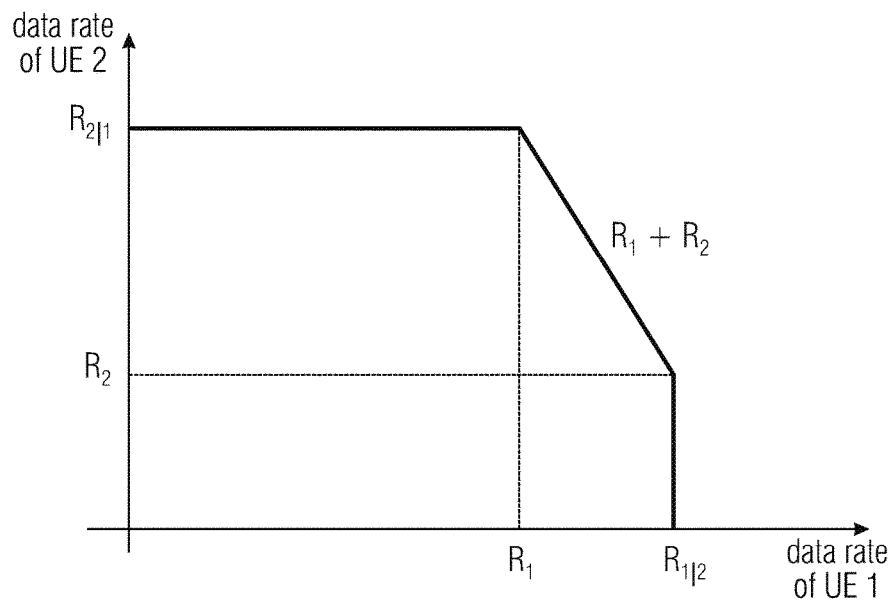

FIG. 8b shows a diagram illustrating the cross-influence of two UEs using MU-MIMO on the resulting data rate. The drawback is that the resource allocation and especially the signal processing are significantly more complex than for the previous approaches.

According to an embodiment user equipments and/or base station carry out multi-user MIMO detection for shared SUDACs, i.e. for the shared virtual antennas of the user equipments. Here, technologies like linear filtering (e.g. based on the minimum mean squared error-criterion), interference cancellation, maximum likelihood-decoding (e.g. using a sphere decoder), or iterative methods approaching the maximum-likelihood-decoding result may be used. Further, the above described methods for resource allocation are applicable for such MU-MIMO concepts, For example, two user equipments can use the same time-frequency resources if different (spreading) code resources are selected. This resource allocation is performed by the above described controller.

Figure 9A:
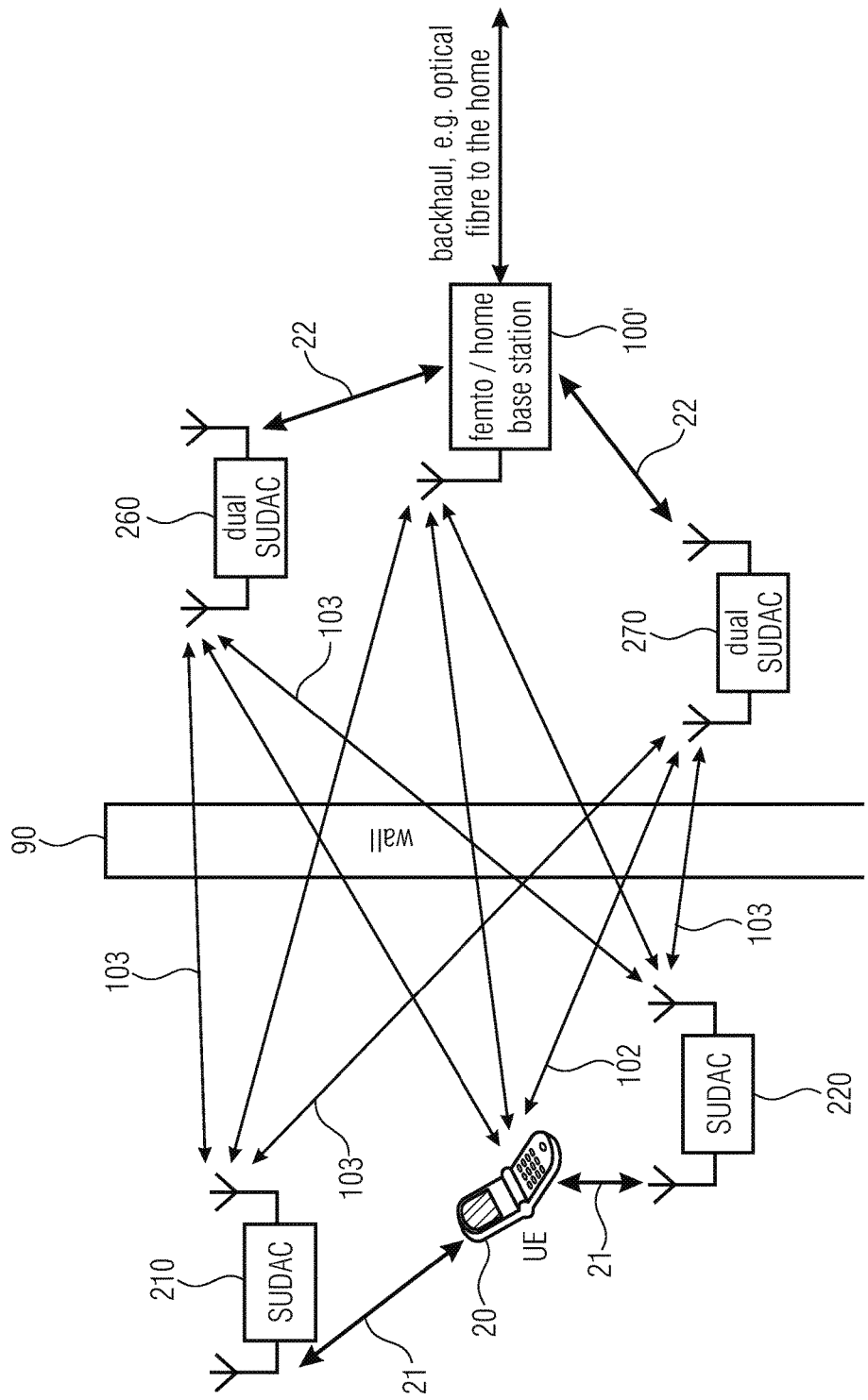
FIG. 9a a schematic block diagram of a SUDAC system comprising a first and a second BS-SUDAC configured for establishing an inter-backend communication link with the base station using the extremely-high frequency.
Figure 9B:
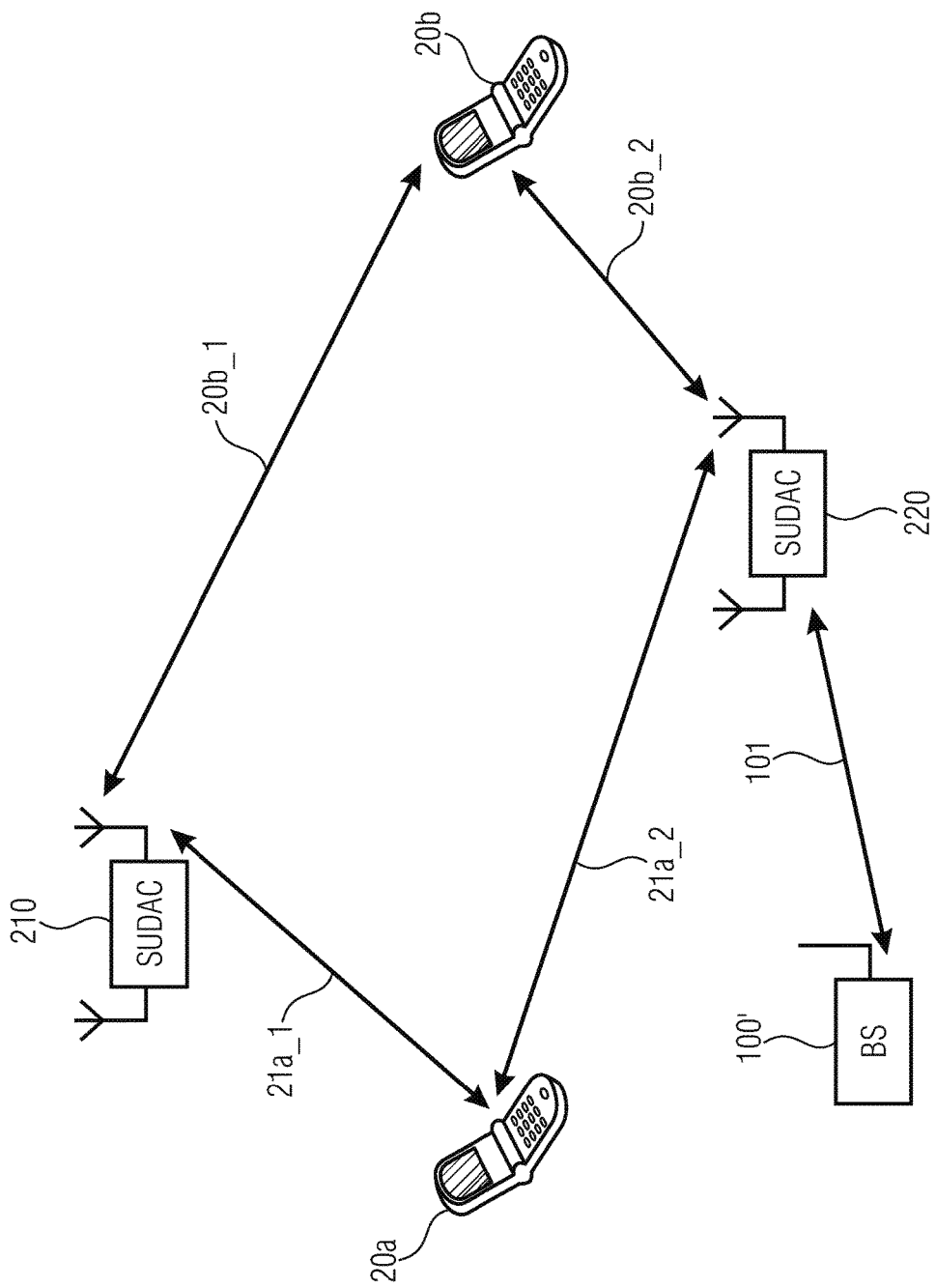
FIG. 9b a schematic block diagram of a SUDAC system comprising two user equipment and two SUDACs, wherein a backend communication link from a SUDAC to the base station is inactive.

The above described controller may also be applicable to other systems comprising a first and a second BS-SUDAC, as illustrated by FIGS. 9a and 9b.

FIG. 9a shows a schematic block diagram of a SUDAC system comprising a first and a second BS-SUDAC 260 and 270 configured for establishing an inter-backend communication link 103 respectively with the base station 100', here a femto/home base station, using the extremely-high frequency (cf. backend link 22). The base station 100' is configured for receiving information from a service provider, e.g., the base station 100' may be a local home base station such as a home server comprising a backhaul connection, e.g., via an optical fiber, a wired connection or a wireless connection. This may be called a femto base station or a home base station. The base station 100' comprises a plurality of wireless communication interfaces or antennas, e.g., 3, 4 or more.

The base station 100' is configured for establishing the backend links 22 based on a LoS connection to the BS-SUDACS 260 and 270. The BS-SUDACS 260 and 270 may thus be utilized as virtual antennas of the base station 100'. When compared to the SUDACs 210 and 220 utilized by the user equipment 20, the base station 100' utilizes the BS-SUDACs 210 and 220 in a similar way, wherein a communication between the base station 100' and the BS-SUDACs 260 and 270 on the first side and the user equipment 20 and the SUDACs 210 and 220 on the second side is enabled by intra network links 101 which are established using the ultra-high frequency. This allows for a distribution of information from the base station 100' to the SUDACs 210 and 220 in a more efficient way, as not only one connection link is established between the base station and a SUDAC each communication partner, user equipment 20, SUDACs 210, 220, BS-SUDACs 260 and 270 and base station 100', may communicate via a plurality or even a multitude of channels to each other.

The BS-SUDAC may be implemented by a SUDAC 210 or 220' configured for establishing a communication link to the base station 100' using the extremely-high frequency and to further SUDACs 210a and 220b and/or to the user equipment 20 using the ultra-high frequency. In simple words, the BS-SUDACs 260 and 270 may be a SUDAC 210 or 220 communicating with the user equipment 20 and the base station 100' in swapped roles.

Alternatively the SUDAC system may comprise only one BS-SUDAC 260 or 270 a different number of one SUDACs, e.g., zero, one or more than two.

In other words, the SUDAS infrastructure can be used to communicate not only from outside a house (Base Station) to the inside, but also for communication between rooms. As depicted in FIG. 9 a home has an (optical) fiber-to-the-home connection that terminates e.g. in the living room. Hence, there is a femto (or home) base station 100' in the respective room, e.g., the living room that possibly uses 60G (band 1) communication in order to provide high data rates to all devices inside the living room. However, in order to reach high data rates also in other rooms (e.g. in the home office), 60G communication is not possible as might not penetrate the walls. Conventional W-Fi might not deliver the desired high data rates, as the MIMO gain is too small (e.g., when the femto base station 100' has at most 4 antennas). However, the femto-BS could communicate to multiple SUDACs in the living room using 60G and transmit a precoded virtual MIMO (VMIMO) signal to these SUDACs 260 and 270, which then relay the signal over a s6G frequency band (band 2) to the home office. Here, several SUDACs 210 and 220 receive the VMIMO signal and forward it over 60G to the user equipment 20, which can then carries out the VMIMO decoding. Of course, the same applies in the other direction for the uplink. This scenario may necessitate for a resource allocation, which includes also the femto base station 100', as it makes use of links/channels in band 2 (which are called "frontend links", but meaning of this breached in this scenario).

FIG. 9b shows a schematic block diagram of a further SUDAC system comprising two user equipment 20a and 20b and two SUDACs 210 and 220. The SUDAC 210 established a frontend communication link 21a_1 with the user equipment 20a and a frontend communication link 21b_1 the user equipment 20b. The SUDAC 220 has established a frontend communication link 21a_2 with the user equipment 20b and a frontend communication link 21b_2 with the user equipment 20a. The frontend communication link 101 between the base station 100' and the SUDAC 220 is (temporarily) inactive, e.g., as none of the user equipment 20a and 20b requests service from the base station 100'. Thus, the user equipment 20a and 20b and the SUDACs 210 and 220 may switch to a device-to-device (D2D) operation mode, e.g., based on a missing or inactive communication link to the base station 100' or based on a user command transmitted by the user equipment 20a or 20b.

The SUDAC System allows for an efficient propagation of information and/or data from one user equipment 20a or 20b to another. This may be intended, for example, for video or audio broadcasting or sharing within a small room or space, e.g., inside a building or a car. The SUDAC System may switch back to regular operation as described above, for example based on a user command or based on a communication request from the base station to a user equipment 20a or 20b or vice versa. Resource allocation may be performed by a controller (or by the SUDAC 210, 220, the user equipment 20a and/or 20b comprising the implemented controller). Thus, at least the controller (comparable to the above discussed controller; i.e. the controlling is performed according to the above discussed controlling principles) may have to be aware of the rest of the communication partners to determine and propagate resource allocation.

Alternatively, only one or more than two SUDACs may be arranged. Alternatively or in addition more than two user equipment may be arranged.

Figure 10A:
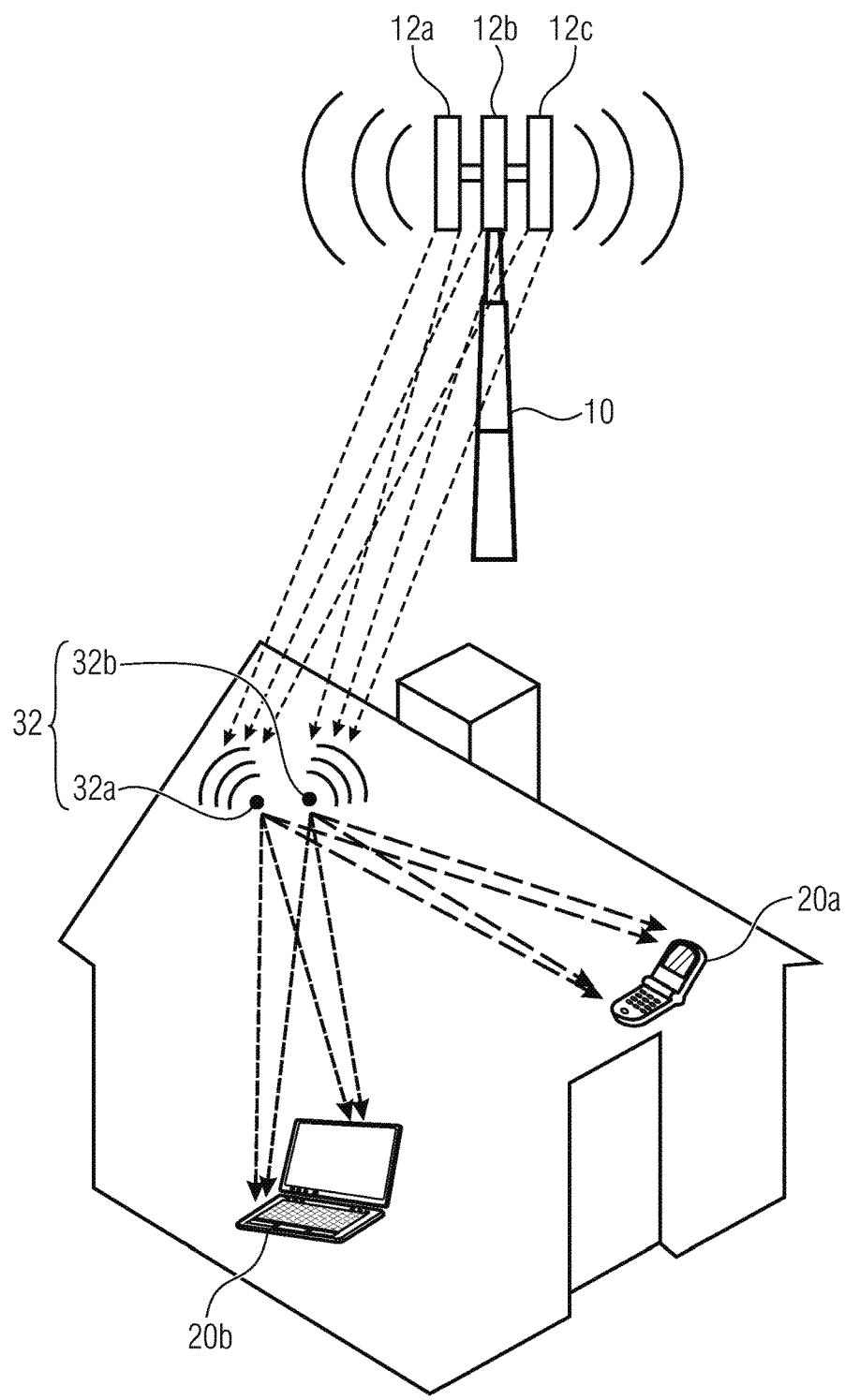
FIG. 10a shows a schematic block diagram of a state of the art relay system comprising a small cell base station.
Figure 10B:
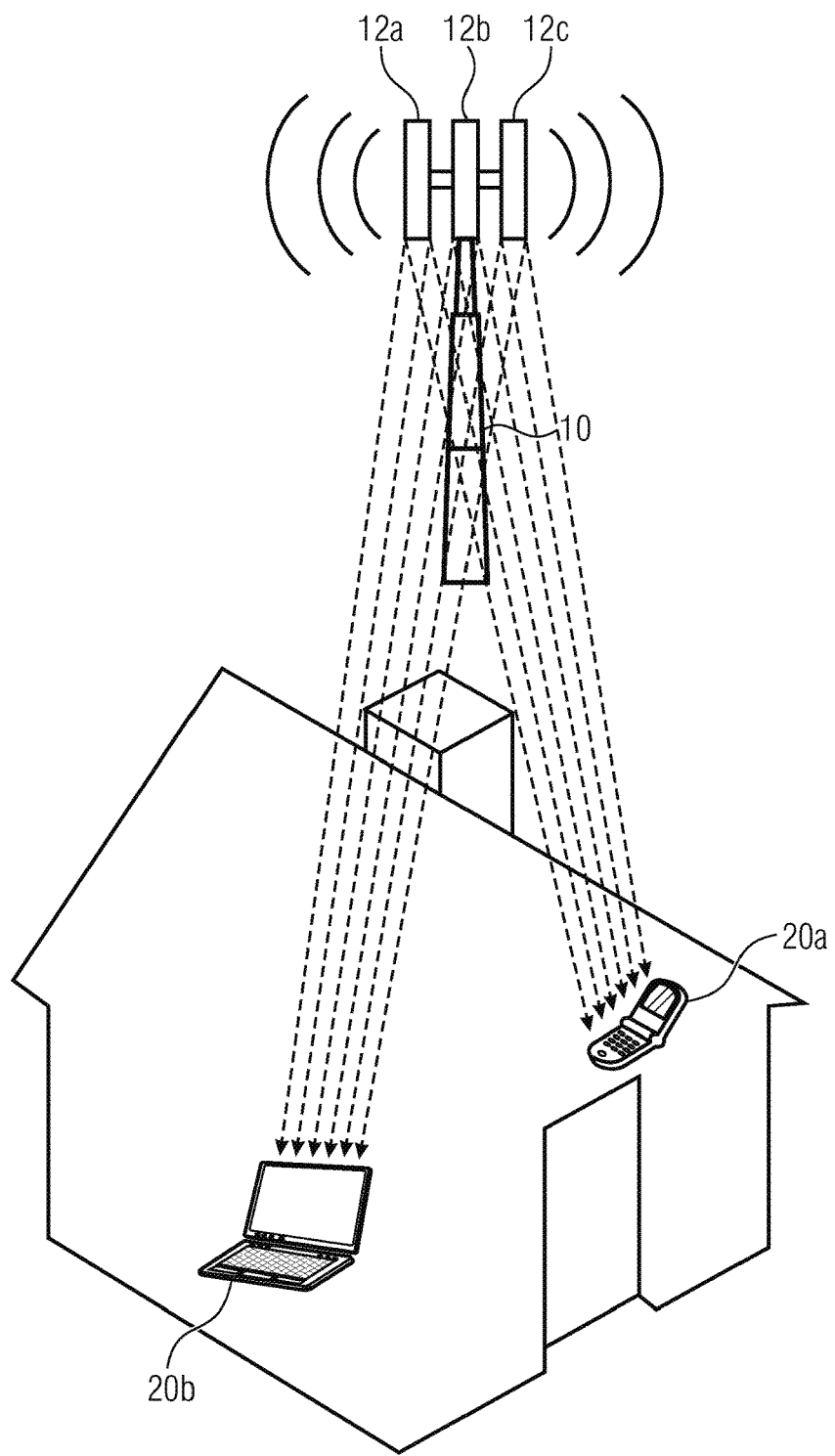
FIG. 10b shows a schematic block diagram of a state of the art approach for increasing the data rate between a base station and a user equipment via a direct link.

In other words, a scenario similar to the scenario depicted in FIG. 10a exists, when two UEs want to exchange data directly (not via a Base station). This is called device-to-device (D2D) communication. One use case is inside a car, where a video player wants to transfer a video to the rear-seat entertainment system including the screens. If the UEs do not "see" each other, they have to communicate using the SUDAS infrastructure in the car. Observe that all communication between the two UEs/devices (by way of the SUDACs) may take place in 60G in this case (in s6G, propagation conditions may be better, but possibly the desired data rate is not reachable in this case). Basically, a single SUDAC would suffice to relay the 60G signal from UE 20a to 20b and/or vice versa. However, there may be reasons, why multiple SUDACs are involved. For example, each individual SUDAC does not provide channels of large enough bandwidth, such that the desired data rates cannot be reached, when using a single SUDAC, but multiple SUDACs have to be used together. Alternatively or in addition, space diversity might be a further reason, as people are moving in the car, and the car is moving in the street, such propagation conditions can vary rapidly. Such a scenario may be taken into account, when the resources in 60G are allocated, wherein the resource allocation is performed or controlled by a controller.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A controller of a Shared User Equipment-Side Distributed Antenna System (SUDA system), the SUDA system comprising a first base station network group and a second base station network group, at least a first Shared User Equipment-Side Distributed Antenna Component (SUDAC) as well as a first user equipment assigned to the first base station network group and a second user equipment assigned to the first base station network group;

wherein each SUDAC is configured to use ultra-high frequency in order to transmit at least one backend communication signal to the first and/or the second base station network group and to use extremely-high frequency in order to transmit at least one frontend communication signal to the first and/or the second user equipment and to forward a payload signal received via the backend communication signal and to be transmitted via the frontend communication signal while frequency converting the ultra-high frequency to the extremely-high frequency and to forward the payload signal received via the frontend communication signal and to be transmitted via the backend communication signal while frequency converting the extremely-high frequency to the ultra-high frequency;

wherein the first user equipment is configured to communicate via a first frontend communication signal with the first SUDAC and via a second frontend communication signal with a second Shared User Equipment-Side Distributed Antenna Component (SUDAC) or via a direct communication signal directly with the first base station network group, wherein the first frontend communication signal is converted to a first backend communication signal used for communication with the first base station network group by the first SUDAC and wherein the second frontend communication signal is converted to a second backend communication signal used for communication with the first base station network group by the second SUDAC;

wherein the second user equipment is configured to communicate via a first frontend communication signal with the first SUDAC and via an second frontend communication signal with the second SUDAC or via a direct communication signal directly with the second base station network group, wherein the first frontend communication signal is converted to a first backend communication signal used for communication with the second base station network group by the second SUDAC and wherein the second frontend communication signal is converted to a second backend communication signal used for communication with the first base station network group by the first SUDAC;

wherein the first and the second user equipment are configured to aggregate the first and the second frontend communication signals or the first frontend communication signal and the direct communication signal in order to increase an available data rate;

wherein the controller is configured to select first resources, wherein a first portion of the first resources characterizes settings of the first frontend communication signal and of the corresponding first backend communication signal and wherein a second portion of the first resources characterizes settings of the second frontend communication signal and of the corresponding second backend communication signal, for the first user equipment and to select second resources, wherein a first portion of the second resources characterizes settings of the first frontend communication signal and of the corresponding first backend communication signal and wherein a second portion of the second resources characterizes settings of the second frontend communication signal and of the corresponding second backend communication signal, for the second user equipment, taking into account data rate requirements and/or data rate capabilities of the first and/or second user equipment and/or of the first and/or second base station network group and/or such that the first frontend communication signals of the first and the second user equipment as well as the second frontend communication signals of the first and the second user equipment are distinguishable from each other and/or such that transmission losses caused by interferences within the first frontend communication signal and the second frontend communication signal of the first and second user equipment are reduced.

2. The controller according to claim 1, wherein the first and the second resources comprise resources out of a group comprising time-resources, frequency-resources, code-resources and/or space-resources.

3. The controller according to claim 2, wherein the controller is configured to control via a control signal the time-resources of the first and the second user equipment and of the first and the second SUDAC comprising a memory by assigning respective time slots to the first and the second frontend communication signals and/or to the first and the second backend communication signal, in order to perform TDM/TDMA modulation; and/or
wherein the controller is configured to control via the control signal the frequency-resources of the first and the second user equipment and of the first and the second SUDAC comprising a frequency and multiplexing converter by assigning respective carrier frequencies to the first and the second frontend communication signals and/or to the first and the second backend communication signal, in order to perform FDM/FDMA modulation; and/or
wherein the controller is configured to control via the control signal the code-resources of the first and the second user equipment and of the first and the second SUDAC comprising a processor by assigning respective special coding schemes to the first and the second frontend communication signals and/or to the first and the second backend communication signal, in order to perform TDM/TDMA modulation, in order to perform CDM/CDMA modulation; and/or
wherein the controller is configured to control via the control signal the space-resources of the first and the second user equipment using the first and the second SUDAC as virtual antennas by transmitting the respective first communication signals and/or the second frontend communication signals to the respective SUDACs, in order to perform SDM/SDMA modulation; and/or
wherein the controller is configured to control via the control signal the further resources comprising variable factors out of a group comprising carrier frequency, carrier spacing, signal power, polarization type, indices of the antenna element, beamforming parameters and/or DSSS-spreading parameters.

4. The controller according to claim 3, wherein the frequency and multiplexing converter is configured to forward the payload signal without decoding.

5. The controller according to claim 1, wherein the controller is configured to select first and second resources based on an evaluation of first grade CSI-data indicating a signal strength at a third user equipment being connected the controller via at least a third SUDAC or based on an evaluation of second grade CSI-data indicating a signal strength at a fourth user equipment being connected the controller via at least a third user equipment and third and fourth SUDAC.

6. The controller according to claim 1, wherein a distance between antennas of the first SUDAC and the second SUDAC are at least 0.5 or 10 times a wavelength of the ultra-high frequency in order to enable beam forming.

7. The controller according to claim 1, wherein the first SUDAC and/or the second SUDAC are integrated in an electricity wall outlet socket, electrical light switches, electrical light outlet, a plug socket device that plugs into a wall socket on its one side and offers a free socket on its other side, a street lamp, or a car or in the first, second or a further user equipment.

8. The controller according to claim 1, wherein the first and second SUDAC are configured to transmit the first and the second frontend communication signals and the first and second backend communication signals between the first user equipment and the first base station group and between the second user equipment and second base station group in parallel.

9. The controller according claim 8, wherein the controller controls the first and the second SUDAC such that the no payload signals are exchanged between the first user equipment and the second base station group and between the second user equipment and the first base station group.

10. The controller according to claim 1, wherein the first and the second backend communication signal of the first or the second user equipment represents a superposition of ultra-high frequency signals transmitted via the first carrier and the second carrier by using at least two antennas of the respective base station group.

11. The controller according to claim 1, wherein the SUDA system comprises a further SUDAC being configured to use ultra-high frequency in order to transmit a further backend communication signal to the first and/or the second base station network group and to use extremely-high frequency in order to transmit a further frontend communication signal to the first and/or the second user equipment,
wherein the controller is configured to use the frontend communication signal and/or the backend communication signal of the further SUDAC instead of the frontend communication signal and/or the backend communication signal of the first or second SUDAC, if a link quality of the frontend communication signal and/or the backend communication signal of the further SUDAC in view of the first and/or the second user equipment is higher when compared to a link quality of the frontend communication signal and/or the backend communication signal of the first or second SUDAC in view of the respective first and/or the second user equipment.

12. The controller according to claim 1, wherein the controller is a joint controller and/or shared controller integrated into first and/or the second user equipment and/or into the first and/or the second SUDAC or wherein the controller is realized as a protocol or algorithm being executed via a control channel connecting the first and the second user equipment and the first and the second SUDAC.

13. The controller according to claim 1, wherein the controller is configured to provide information regarding available SUDACs to the first and/or second base station group such that the first and/or second base station group performs the resource allocation of the backend communication signal based on the information.

14. The controller according to claim 1, wherein the controller is configured to select or to initiate the selection of time-frequency-code resources used for the backend communication signal and to select the first and/or second resources enabling an assignment of the SUDACs to the respective user equipments in order to allow use of multi user MIMO and/or such that the respective SUDAC is used either by one of the user equipments at any one time or by a plurality of the user equipments simultaneously.

15. The controller according to claim 14, wherein the controller select the resources such that multiple simultaneous spreading codes are assigned to one of the user equipments in order to allow rate splitting in a MU-MIMO transmission.

16. A first user equipment, comprising a controller according to claim 1.

17. A SUDAC which is controllable by a controller according to claim 1.

18. A SUDA system comprising a first base station network group and a second base station network group, a first and a second SUDAC as well as a first user equipment assigned to the first base station network group and a second user equipment assigned to the first base station network group and a controller according to claim 1.

19. A method for controlling a Shared User Equipment-Side Distributed Antenna System (SUDA system), the SUDA system comprising a first base station network group and a second base station network group, at least a first Shared User Equipment-Side Distributed Antenna Component (SUDAC) as well as a first user equipment assigned to the first base station network group and a second user equipment assigned to the first base station network group,
  wherein each SUDAC is configured to use ultra-high frequency in order to transmit at least one backend communication signal to the first and/or the second base station network group and to use extremely-high frequency in order to transmit at least one frontend communication signal to the first and/or the second user equipment and to forward a payload signal received via the backend communication signal and to be transmitted via the frontend communication signal while frequency converting the ultra-high frequency to the extremely-high frequency and to forward the payload signal received via the frontend communication signal and to be transmitted via the backend communication signal while frequency converting the extremely-high frequency to the ultra-high frequency,
  wherein the first user equipment is configured to communicate via a first frontend communication signal with the first SUDAC and via a second frontend communication signal with a second Shared User Equipment-Side Distributed Antenna Component (SUDAC) or via a direct communication signal directly with the first base station network group, wherein the first frontend communication signal is converted to a first backend communication signal used for communication with the first base station network group by the first SUDAC and wherein the second frontend communication signal is converted to a second backend communication signal used for communication with the first base station network group by the second SUDAC;
  wherein the second user equipment is configured to communicate via a first frontend communication signal with the first SUDAC and via a second frontend communication signal with the second SUDAC or via a direct communication signal directly with the second base station network group, wherein the first frontend communication signal is converted to a first backend communication signal used for communication with the second base station network group by the second SUDAC and wherein the second frontend communication signal is converted to a second backend communication signal used for communication with the second base station network group by the first SUDAC;
  wherein the first and the second user equipment are configured to aggregate the first and the second frontend communication signal or the first frontend communication signal and the direct communication signal in order to increase an available data rate;
  the method comprising:
  selecting first resources, wherein a first portion of the first resources characterizes settings of the first frontend communication signal and of the corresponding first backend communication signal and wherein a second portion of the first resources characterizes settings of the second frontend communication signal and of the corresponding second backend communication signal, for the first user equipment; and
  selecting second resources, wherein a first portion of the second resources characterizes settings of the first frontend communication signal and of the corresponding first backend communication signal and wherein a second portion of the second resources characterizes settings of the second frontend communication signal and of the corresponding second backend communication signal, for the second user equipment,
  taking into account requirements of the first and/or second user equipment and/or of the first and/or second base station network group and/or such that the first frontend communication signals of the first and the second user equipment as well as the second frontend communication signals of the first and the second user equipment are distinguishable from each other and/or such that transmission losses caused by interferences within the first frontend communication signal and the second frontend communication signal of the first and second user equipment are reduced.

20. A non-transitory digital storage medium having stored thereon a computer program for performing a method for controlling a Shared User Equipment-Side Distributed Antenna System (SUDA system), the SUDA system comprising a first base station network group and a second base station network group, at least a first Shared User Equipment-Side Distributed Antenna Component (SUDAC) as well as a first user equipment assigned to the first base station network group and a second user equipment assigned to the first base station network group,
  wherein each SUDAC is configured to use ultra-high frequency in order to transmit at least one backend communication signal to the first and/or the second base station network group and to use extremely-high frequency in order to transmit at least one frontend communication signal to the first and/or the second user equipment and to forward a payload signal received via the backend communication signal and to be transmitted via the frontend communication signal while frequency converting the ultra-high frequency to the extremely-high frequency and to forward the payload signal received via the frontend communication signal and to be transmitted via the backend communication signal while frequency converting the extremely-high frequency to the ultra-high frequency,
  wherein the first user equipment is configured to communicate via a first frontend communication signal with the first SUDAC and via a second frontend communication signal with a second Shared User Equipment- Side Distributed Antenna Component (SUDAC) or via a direct communication signal directly with the first base station network group, wherein the first frontend communication signal is converted to a first backend communication signal used for communication with the first base station network group by the first SUDAC and wherein the second frontend communication signal is converted to a second backend communication signal used for communication with the first base station network group by the second SUDAC;

wherein the second user equipment is configured to communicate via a first frontend communication signal with the first SUDAC and via a second frontend communication signal with the second SUDAC or via a direct communication signal directly with the second base station network group, wherein the first frontend communication signal is converted to a first backend communication signal used for communication with the second base station network group by the second SUDAC and wherein the second frontend communication signal is converted to a second backend communication signal used for communication with the second base station network group by the first SUDAC;

wherein the first and the second user equipment are configured to aggregate the first and the second frontend communication signal or the first frontend communication signal and the direct communication signal in order to increase an available data rate;

the method comprising:

selecting first resources, wherein a first portion of the first resources characterizes settings of the first frontend communication signal and of the corresponding first backend communication signal and wherein a second portion of the first resources characterizes settings of the second frontend communication signal and of the corresponding second backend communication signal, for the first user equipment; and selecting second resources, wherein a first portion of the second resources characterizes settings of the first frontend communication signal and of the corresponding first backend communication signal and wherein a second portion of the second resources characterizes settings of the second frontend communication signal and of the corresponding second backend communication signal, for the second user equipment, taking into account requirements of the first and/or second user equipment and/or of the first and/or second base station network group and/or such that the first frontend communication signals of the first and the second user equipment as well as the second frontend communication signals of the first and the second user equipment are distinguishable from each other and/or such that transmission losses caused by interferences within the first frontend communication signal and the second frontend communication signal of the first and second user equipment are reduced, when said computer program is run by a computer.

21. A controller of a Shared User Equipment-Side Distributed Antenna System (SUDA system), the SUDA system comprising a first base station network group, at least a first Shared User Equipment-Side Distributed Antenna Component (SUDAC) and at least a first Base Station Shared User Equipment-Side Distributed Antenna Component (BS-SUDAC) as well as a first user equipment, wherein each SUDAC is configured to use ultra-high frequency in order to transmit at least one backend communication signal to the first base station network group or at least one inter-backend communication signal to the BS-SUDAC and to use extremely-high frequency in order to transmit at least one frontend communication signal to the first user equipment and to forward a payload signal received via the backend communication signal or received via the inter-backend communication signal and to be transmitted via the frontend communication signal while frequency converting the ultra-high frequency to the extremely-high frequency and to forward the payload signal received via the frontend communication signal and to be transmitted via the backend communication signal or to be transmitted via the inter-backend communication signal while frequency converting the extremely-high frequency to the ultra-high frequency;

wherein each BS-SUDAC is configured to use extremely-high frequency in order to transmit at least one frontend communication signal to the first base station network group and to use ultra-high frequency in order to transmit at least one inter-backend communication signal to the first SUDAC or in order to transmit at least one backend communication signal to the first user equipment and to forward a payload signal received via the frontend communication signal and to be transmitted via the inter-backend communication signal or via the backend communication signal while frequency converting the extremely-high frequency to the ultra-high frequency and to forward the payload signal received via the inter-backend communication signal or received via the backend communication signal and to be transmitted via the frontend communication signal while frequency converting the ultra-high frequency to the extremely-high frequency;

wherein the first user equipment is configured to communicate via a first direct communication signal with the first base station group directly or via a first frontend communication signal with the first SUDAC, wherein the first frontend communication signal is converted to a first backend communication signal used for communication with the first base station network group by the first SUDAC; and/or wherein the first frontend communication signal is converted to a first inter-backend communication signal used for communication with the first base station network group via the BS-SUDAC by the first SUDAC;

wherein the controller is configured to select first resources, wherein a first portion of the first resources characterizes settings of the first frontend communication signal and of the corresponding first backend communication signal or of the inter-backend communication signal, taking into account data rate requirements and/or data rate capabilities of the first and user equipment and/or of the first base station network group, and/or such that the first frontend communication signals of the first user equipment are distinguishable from other signals and/or such that transmission losses caused by interferences within the first frontend communication signal of the first user equipment are reduced.

22. The controller according to claim 21, wherein the SUDAC and/or the BS-SUDAC are formed by an user equipment.

23. The controller according to claim 21, wherein the controller is configured to select the first resources such that the first user equipment communicates via the first frontend communication signal with a further user equipment forming the first SUDAC in order to operate in a device-to-device operation mode.

\* \* \* \* \*